United States Patent
Vamaraju et al.

(10) Patent No.: US 9,961,497 B2
(45) Date of Patent: May 1, 2018

(54) TECHNIQUES FOR INFINITE RANGING SESSION

(71) Applicant: QUALCOMM Incorporated, San Diego, CA (US)

(72) Inventors: Santosh Vamaraju, San Jose, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 15/216,586

(22) Filed: Jul. 21, 2016

(65) Prior Publication Data

US 2017/0238135 A1     Aug. 17, 2017

Related U.S. Application Data

(60) Provisional application No. 62/296,242, filed on Feb. 17, 2016.

(51) Int. Cl.
*H04W 24/00*    (2009.01)
*H04W 4/02*    (2018.01)
*H04W 56/00*    (2009.01)

(52) U.S. Cl.
CPC ....... *H04W 4/023* (2013.01); *H04W 56/0015* (2013.01)

(58) Field of Classification Search
CPC ....... H04W 4/02; H04W 64/00; H04W 76/02; H04W 84/18; H04W 88/023

USPC ................... 455/456.1, 456.2, 41.2
See application file for complete search history.

(56) References Cited

U.S. PATENT DOCUMENTS

| | | | |
|---|---|---|---|
| 2014/0355461 A1 | 12/2014 | Aldana et al. | |
| 2016/0119805 A1* | 4/2016 | Aldana | H04L 43/106 370/252 |
| 2017/0142608 A1* | 5/2017 | Vamaraju | H04W 24/10 |
| 2017/0188300 A1* | 6/2017 | Eyal | H04W 52/0209 |

OTHER PUBLICATIONS

Aldana, C. (Jan. 18, 2016). FTM Parameters for 802.1AS Background [PowerPoint slides]. Retrieved on Jan. 20, 2017 from http://www.ieee802.org/1/files/public/docs2016/asrev-caldana-FTM-parameters-0116-v01.pdf XP055337368.
International Search Report and Written Opinion—PCT/US2017/014829—ISA/EPO—Apr. 6, 2017—13 pgs.

(Continued)

*Primary Examiner* — Temica M Beamer
(74) *Attorney, Agent, or Firm* — Hunter Clark PLLC

(57) ABSTRACT

Techniques for establishing a fine timing measurement (FTM) session of infinite duration between wireless devices is provided. A method according to these techniques includes generating, at a first wireless device, a first request to establish an FTM session with a second wireless device using an FTM protocol, the first request comprising one or more session parameters having a value indicative that the first wireless device is requesting the FTM session have an infinite session duration, receiving one or more FTM measurement messages from the second wireless device, and sending a second request to the second wireless device requesting that the FTM session be terminated.

24 Claims, 10 Drawing Sheets

(56) References Cited

OTHER PUBLICATIONS

IEEE (Jan. 2016). P802.11-REVmcTM/D5.0, Draft Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications, 3766 pgs.

\* cited by examiner

Fine Timing Measurement Request frame format

Fine Timing Measurement Action field format

Fine Timing Measurement Parameters field format

TECHNIQUES FOR INFINITE RANGING SESSION

CROSS REFERENCE TO RELATED APPLICATION

This application claims priority to U.S. Provisional Patent Application Ser. No. 62/296,242, entitled "TECHNIQUES FOR INFINITE RANGING SESSION," filed on Feb. 17, 2016, which is assigned to the assignee hereof and incorporated by reference.

BACKGROUND

Mobile wireless devices can use ranging techniques to determine their location relative to other wireless devices at known locations. Ranging information can be used to provide for location-based services to the mobile wireless device, to select a wireless access point or wireless base station to provide network connectivity to the mobile wireless device, to determine the location of the mobile device where range information to multiple wireless access points, wireless base stations, or other mobile wireless devices at known locations is available. Ranging information can also be used provide other types of services to the mobile wireless device.

SUMMARY

An example method for establishing a fine timing measurement (FTM) session between wireless devices device according to the disclosure includes generating, at a first wireless device, a first request to establish an FTM session with a second wireless device using an FTM protocol, the first request comprising one or more session parameters having a value indicative that the first wireless device is requesting the FTM session have an infinite session duration, receiving one or more FTM measurement messages from the second wireless device, and sending a second request to the second wireless device requesting that the FTM session be terminated.

Implementations of such a method can include one or more of the following features. Determining a range from the first wireless device to the second wireless device based on an FTM measurement message from the second wireless device. Extracting a value of a timing synchronization function parameter from the one or more FTM measurement messages received from the second wireless device; and synchronizing a timer of the first wireless device with the value of the timing synchronization function parameter extracted from the one or more FTM measurement messages. The first request to establish the FTM session comprises an FTM request frame, and setting a value of at least one field of the FTM request frame to a value indicating that the FTM session is to be terminated. The first request to establish the FTM session with the second wireless device comprises an FTM request frame, and generating the first request to establish the FTM session with the second wireless device using the FTM protocol further includes setting a value of at least one field of the FTM request frame to a value indicating that the FTM session is to be of infinite duration. The value indicating that the FTM session is to be of an infinite duration includes a value indicative that the first wireless device has no preference with regard to an FTM parameter associated with the at least one field, and the second wireless device is configured to recognize that the value of the at least one field is indicative of the first wireless device requesting the FTM session is to be of infinite duration.

An apparatus for establishing a fine timing measurement (FTM) session between wireless devices according to the disclosure includes means for generating, at a first wireless device, a first request to establish an FTM session with a second wireless device using an FTM protocol, the first request comprising one or more session parameters having a value indicative that the first wireless device is requesting the FTM session have an infinite session duration, means for receiving one or more FTM measurement messages from the second wireless device, and means for sending a second request to the second wireless device requesting that the FTM session be terminated. Means for determining a range from the first wireless device to the second wireless device based on an FTM measurement message from the second wireless device.

Implementations of such an apparatus can include one or more of the following features. Means for extracting a value of a timing synchronization function parameter from the one or more FTM measurement messages received from the second wireless device, and means for synchronizing a timer of the first wireless device with the value of the timing synchronization function parameter extracted from the one or more FTM measurement messages. The first request to establish the FTM session includes an FTM request frame, and means for setting a value of at least one field of the FTM request frame to a value indicating that the FTM session is to be terminated. The first request to establish the FTM session with the second wireless device includes an FTM request frame, and the means for generating the first request to establish the FTM session with the second wireless device using the FTM protocol includes means for setting a value of at least one field of the FTM request frame to a value indicating that the FTM session is to be of infinite duration. The value indicating that the FTM session is to have an infinite session duration includes a value indicative that the first wireless device has no preference with regard to an FTM parameter associated with the at least one field, and the second wireless device is configured to recognize that the value of the at least one field is indicative of the first wireless device requesting the FTM session is to be of infinite duration.

An example apparatus for establishing a fine timing measurement (FTM) session between wireless devices according to the disclosure includes a transceiver, a memory, and at least one processor coupled to the memory and to the transceiver. The at least one processor is configured to generate, at a first wireless device, a first request to establish an FTM session with a second wireless device using an FTM protocol, the first request comprising one or more session parameters having a value indicative that the first wireless device is requesting the FTM session have an infinite session duration. The apparatus also includes a receiver configured to receive one or more FTM measurement messages from the second wireless device, and the at least one processor is further configured to send a second request, via the transceiver, to the second wireless device requesting that the FTM session be terminated.

Implementations of such an apparatus can include one or more of the following features. The at least one processor is further configured to determine a range from the first wireless device to the second wireless device based on an FTM measurement message from the second wireless device. The at least one processor is further configured to extract a value of a timing synchronization function parameter from the one or more FTM measurement messages received from the second wireless device, and synchronize a timer of the first wireless device with the value of the timing synchronization function parameter extracted from the one or more FTM measurement messages. The first request to establish the FTM session comprises an FTM request frame, and the at least one processor is further configured to set a value of at least one field of the FTM request frame to a value indicating that the FTM session is to be terminated. The first request to establish the FTM session with the second wireless device comprises an FTM request frame, and the at least one processor being configured to generate the first request to establish the FTM session with the second wireless device using the FTM protocol is further configured to set a value of at least one field of the FTM request frame to a value indicating that the FTM session is to be of infinite duration. The value indicating that the FTM session is to have an infinite session duration includes a value indicative that the first wireless device has no preference with regard to an FTM parameter associated with the at least one field, the second wireless device is configured to recognize that the value of the at least one field is indicative of the first wireless device requesting the FTM session is to be of infinite duration.

A non-transitory, computer-readable medium, having stored thereon computer-readable instructions for establishing a fine timing measurement (FTM) session between wireless devices according to the disclosure includes instructions configured to cause a computer to generate a first request to establish an FTM session with a second wireless device using an FTM protocol, the first request comprising one or more session parameters having a value indicative that a first wireless device is requesting the FTM session have an infinite session duration, receive one or more FTM measurement messages from the second wireless device, and send a second request to the second wireless device requesting that the FTM session be terminated.

Implementations of such a non-transitory, computer-readable medium can include one or more of the following features. Instructions configured to cause the computer to determine a range from the first wireless device to the second wireless device based on an FTM measurement message from the second wireless device. Instructions configured to cause the computer to extract a value of a timing synchronization function parameter from the one or more FTM measurement messages received from the second wireless device, and synchronize a timer of the first wireless device with the value of the timing synchronization function parameter extracted from the one or more FTM measurement messages. The first request to establish the FTM session comprises an FTM request frame, and instructions configured to cause the computer to set a value of at least one field of the FTM request frame to a value indicating that the FTM session is to be terminated. The first request to establish the FTM session with the second wireless device includes an FTM request frame, and the instructions configured to cause the computer to generate the first request to establish the FTM session with the second wireless device using the FTM protocol include instructions configured to cause the computer to set a value of at least one field of the FTM request frame to a value indicating that the FTM session is to be of infinite duration. The value indicating that the FTM session is to have an infinite session duration comprises a value indicative that the first wireless device has no preference with regard to an FTM parameter associated with the at least one field, and the second wireless device is configured to recognize that the value of the at least one field is indicative of the first wireless device requesting the FTM session is to be of infinite duration.

BRIEF DESCRIPTION OF THE DRAWING

Like reference symbols in the various drawings indicate like elements, in accordance with certain example implementations.

DETAILED DESCRIPTION

Figure 1:
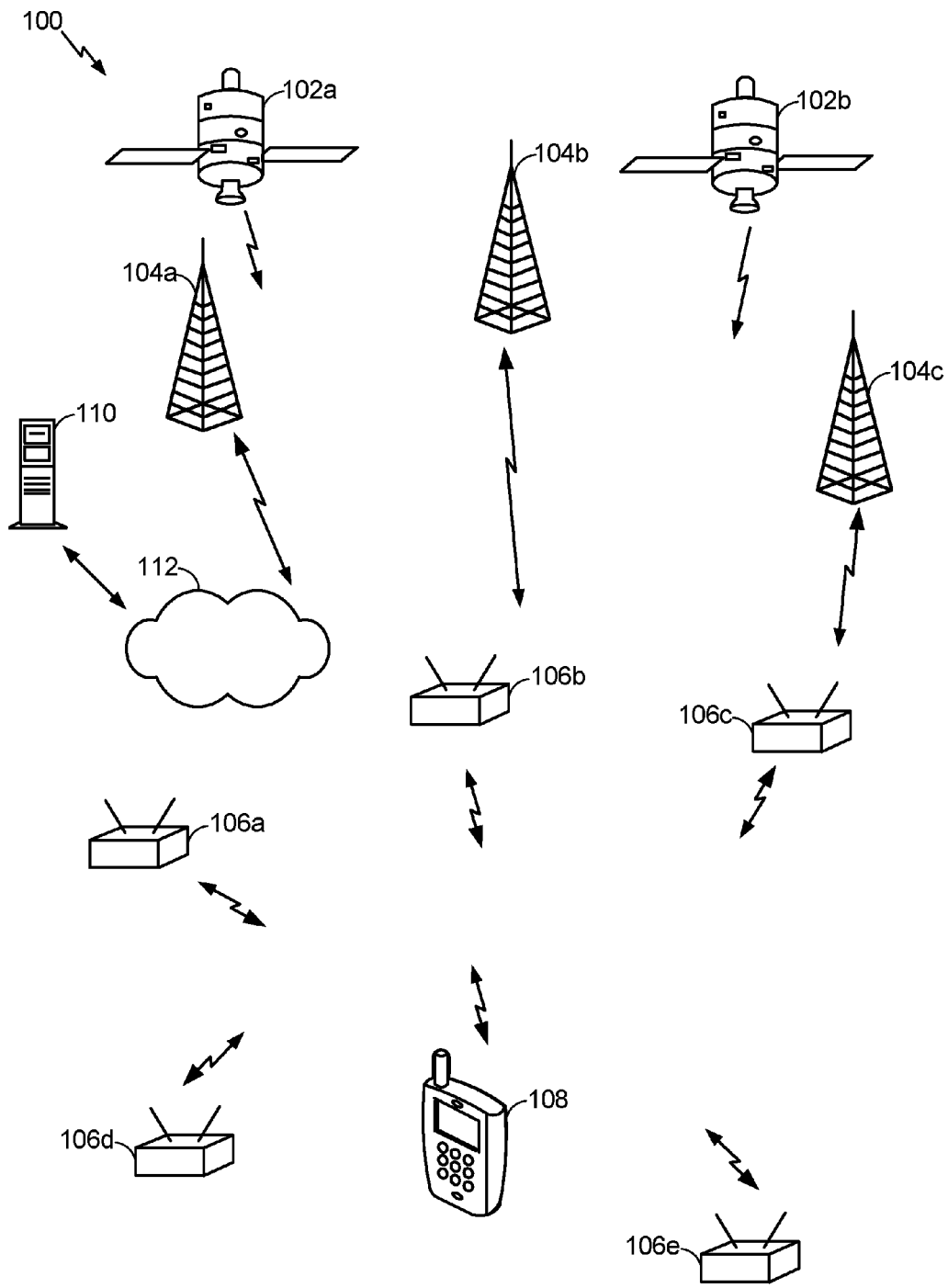
FIG. 1 is a schematic diagram of an example operating environment that includes a mobile wireless device in communication with one or more wireless nodes, in accordance with certain example implementations.

Described herein are methods, systems, devices, computer readable media, and other implementations, for determining range information representing a range between a first wireless device and a second wireless device. The range information can be determined using Fine Timing Measurement (FTM) protocols to establish an FTM session between the first wireless device and a second wireless device. The FTM protocols (messaging) may be included in various wireless protocols such as Long-Term Evolution (LTE), 5G, BLUETOOTH, Wi-Fi, etc. The FTM protocols provide for an FTM session that has a finite duration based on one or more FTM session parameters. The FTM session parameters may be requested by the first wireless device attempting to initiate the FTM session with the second wireless device, and the second wireless device may agree to establish the FTM session using the requested protocols or propose alternate FTM session parameters. Once the parameters of the FTM session have been satisfied, the FTM session can be terminated by the second wireless and the first wireless device would need to renegotiate a new session if additional ranging information is desired. However, the techniques disclosed herein can be used to implement an "infinite" FTM-ranging session that enables the first wireless device to negotiate with the second wireless device using the FTM protocols without having to define a predetermined set of criteria that determine the duration of the FTM session. The first wireless device would not need to periodically renegotiate the FTM session with the second wireless device and can terminate the FTM session when desired by sending a message to the second wireless device.

Techniques discussed herein include methods, systems, devices, computer readable media, and other implementations for establishing a fine timing measurement (FTM) session between wireless devices. An example method according to these techniques, that may be implemented by an initiating wireless device, includes: generating, at a first wireless device, a request to establish an FTM session with a second wireless device using an FTM protocol, the request comprising one or more session parameters having a value indicative that the first wireless device is requesting an FTM session having an infinite session duration; receiving one or more FTM measurement messages from the second wireless device; and sending a request to the second wireless device requesting that the FTM session be terminated. Another example method according to these techniques, that may be implemented by a responding wireless device, includes: receiving, at a first wireless device, a request to establish an FTM session with a second wireless device using an FTM protocol, the request comprising one or more session parameters having a value indicative that the second wireless device is requesting an FTM session having an infinite session duration; establishing an infinite FTM session with the second wireless device based on the request parameters; and sending one or more FTM measurement messages to the second wireless device until a request message is received from the second wireless device requesting that the infinite FTM session be terminated. Implementations of such example systems and methods are illustrated in the accompanying figures and discussed in detail in the following example implementations.

With reference to FIG. 1, shown is a schematic diagram of an example operating environment 100 that includes a wireless device (also referred to as a mobile wireless device or as a mobile station) 108 in communication with one or more wireless nodes. The mobile device 108 is configured, in some embodiments, to obtain location information for one or more of the wireless node (e.g., access points 104*a-c* and 106*a-e* depicted in FIG. 1 or another mobile device 108) with which the mobile device communicates, to receive and measure signals from the one or more wireless nodes (e.g., to determine/derive signal strength values for the received signals), to process the received and measured signals based, at least in part, on the obtained location information, to determine the range of the mobile device 108 to the one or more of the wireless node, and/or to perform other operations utilizing the ranging information such as determining the location of the mobile device 108. The processing performed by the mobile device (or, alternatively, by some other remote device in communication with the mobile device 108) may include performing location determination operations based, at least in part, on the signals (e.g., the signals' determined strength values) received from the one or more transmitting nodes.

The techniques disclosed herein provide for an "infinite" session that is not subject to the limitations discussed above. The term "infinite" as used herein refers to an FTM session that does not have a predetermined finite duration as defined by one or more FTM session parameters. An infinite FTM session allows the initiating device to continue to receive ranging information from the responding device indefinitely. The initiating device can request that the FTM session be terminated by sending a request message to the responding device. By providing for infinite FTM sessions, the ranging capabilities of the mobile device 108 and services depending upon such ranging capabilities can be improved. An example implementation of the techniques discussed herein may be applied to a scenario where a remote control device can be configured to request infinite ranging sessions with multiple televisions sets within a dwelling. As a user moves from one room to another within the dwelling while carrying the remote control device, a first television in a room from which the user is leaving can be configured to use the ranging information to determine that the first television should switch off, while a second television in a room into which the user is entering can be configured to use the ranging information to determine that the second television should switch on to continue playing a program that was playing on the first television. The content can be switched from the first television to the second television based on the ranging information and without an express instruction from the user to transfer the content from the first television to the second television. The programming information may be provided to the second television by the first television, the remote control device, or by another network device, such as a content server configured to track which programming the user was accessing on the first television and to provide that information to the second television. This example illustrates one situation where infinite ranging sessions might be used. This example is not intended to limit the techniques disclosed herein to such an implementation. These techniques can be applied to other situations where infinite ranging session information could be used.

The mobile device 108 may be configured, in some embodiments, to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, etc., and as such the mobile device 108 may include one or more interfaces to communicate with the various types of communications systems. As used herein, communication systems/devices/nodes with which the mobile device 108 may communicate are also referred to as access points (AP's) or base stations.

As noted, the operating environment 100 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the operating environment 100 may include the Local Area Network Wireless Access Points (LAN-WAPs), such as access points 106*a-e*, that may be used for wireless voice and/or data communication with the mobile device 108. The access points 106*a-e* may also be utilized, in some embodiments, as independents sources of position data, e.g., through fingerprinting-based procedures, through implementation of multilateration-based procedures based, for example, on timing-based techniques (e.g., RTT-based measurements), signal strength measurements (e.g., RSSI measurements), etc. The LAN-WAPs, such as access points, 106*a-e* can be part of a Wireless Local Area Network (WLAN), which may operate in buildings and perform communications over smaller geographic regions than a WWAN. Additionally in some embodiments, the LAN-WAPs, such as access points 106*a-e*, could also include pico or femto cells. As will be further discussed in greater details, one or more of the LAN-WAP nodes depicted in FIG. 1 may be configured to communicate antenna information for the antenna(s) of the transmitting nodes, with such information including one or more of, for example, antenna gain information for the transmitter, antenna model information for the transmitter, antenna orientation/pattern information, antenna down-tilt information, etc. In some embodiments, the LAN-WAPs, such as access points 106a-e, may be part of, for example, WiFi networks (802.11x), cellular piconets and/or femtocells, Bluetooth® wireless technology Networks, etc. The LAN-WAPs, such as access points 106a-e, can also include an indoor positioning system. An indoor positioning system implementation may, in some embodiments, be configured so that a mobile device can communicate with a server that provides the device with data (such as to provide the assistance data, e.g., floor plans, AP MAC IDs, RSSI maps, etc.) for a particular floor or some other region where the mobile device is located. Although five (5) LAN-WAP access points are depicted in FIG. 1, any number of such LAN-WAP's may be used, and, in some embodiments, the operating environment 100 may include no LAN-WAPs access points at all, or may include a single LAN-WAP access point.

As further illustrated, the operating environment 100 may also include a plurality of one or more types of the Wide Area Network Wireless Access Points (WAN-WAPs), such as access points 104a-c, which may be used for wireless voice and/or data communication, and may also serve as another source of independent information through which the mobile device 108 may determine its position/location. The access points 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each of the access points 104a-104c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the operating environment 100 may include no WAN-WAPs at all, or may include a single WAN-WAP.

Communication to and from the mobile device 108 (to exchange data, enable location determination operations with respect to the position(s) of the mobile device 108, etc.) may be implemented, in some embodiments, using various wireless communication networks and/or technologies such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers specifically designed to receive signals for deriving geo-location information from the SPS satellites. In embodiments in which the mobile device 108 can receive satellite signals, the mobile device may utilize a receiver (e.g., a GNSS receiver) specifically implemented for use with the SPS to extract position data from a plurality of signals transmitted by at least the SPS satellite vehicles 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise enabled, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise enabled, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

The operating environment 100 may further include a server 110 (e.g., a location server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile devices. For example, the server 110 may be configured to establish communication links with one or more of the WLAN nodes, such as the access points 106a-e, which may be part of the network 112, to communicate data and/or control signals to those access points, and receive data and/or control signals from the access points. Each of the access points 106a-e can, in turn, establish communication links with mobile devices located within range of the respective access points 106a-e. The server 110 may also be configured to establish communication links (directly via a wireless transceiver(s), or indirectly, via a network connection) with one or more of the WWAN nodes, such as the access points 104a-c depicted in FIG. 1, which may also be part of the network 112. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile device 108 via the network 112. In such embodiments, the server 110 may not establish communication links with some or all of access points 104a-c and the access points 106a-e. In some embodiments, the server 110 may implement such protocols as Secure User plane Location (SUPL). User plane Location Protocol (ULP), LTE Positioning Protocol (LPP) and/or the LPP Extensions (LPPe) protocol for direct communication and to control and transfer measurements. The LPP protocol is defined by 3GPP, and the ULP and LPPe protocols are defined by the Open Mobile Alliance (OMA). In some embodiments, the server 110 may also be used to implement a central repository of information to store, inter alia, antenna information for multiple wireless nodes and devices.

Thus, in some embodiments, the mobile device 108 may communicate with any one or a combination of the SPS satellite vehicles 102a-b, the access points 104a-c, and/or the LAN-WAPs, such as access points 106a-e. In some embodiments, each of the aforementioned systems can provide an independent information estimate of the position for the mobile device 108 using the same or different techniques. In some embodiments, the mobile device may combine the solutions derived from each of the different types of access points to improve the accuracy of the position data. It is also possible to hybridize measurements from different systems to get a position estimate, particularly when there is an insufficient number of measurements from all individual systems to derive a position. For instance, in an urban canyon setting, only one GNSS satellite may be visible and provide adequate measurements (i.e. raw pseudorange and Doppler observables). By itself, this single measurement cannot provide a position solution. However, it could be combined with measurements from urban WiFi APs, or WWAN cell ranges. When deriving a position using the access points 104a-b, 106a-e, and/or the satellite vehicles 102a-b, at least some of the operations/processing may be performed using a server (e.g., a positioning server) 110 which may be accessed, in some embodiments, via a network 112.

Figure 2:
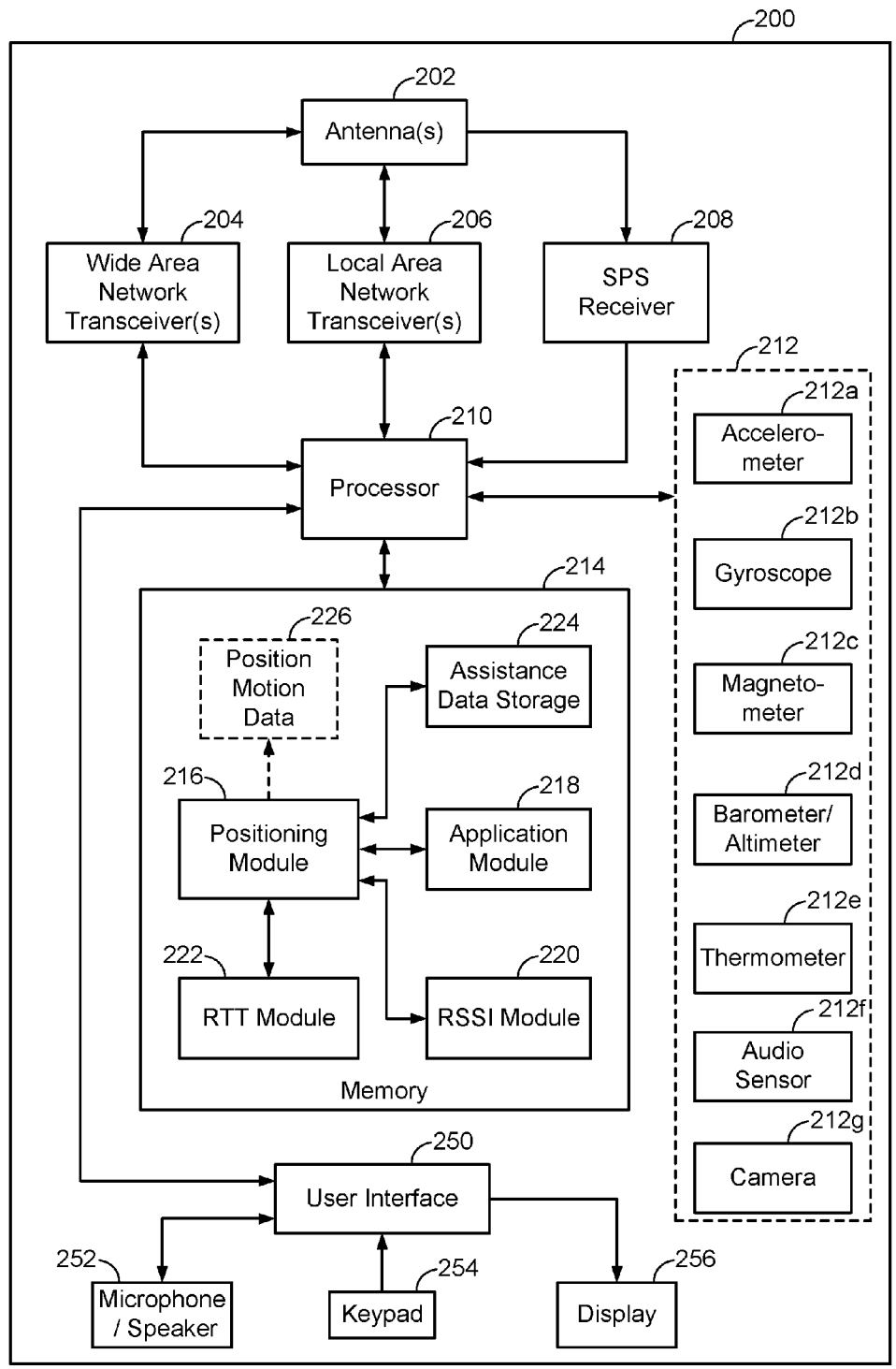
FIG. 2 is a schematic diagram of an example wireless device (e.g., a mobile wireless device), in accordance with certain example implementations.

With reference now to FIG. 2, a schematic diagram illustrating various components of an example mobile device 200, which may be similar to or the same as the mobile device 108 depicted in FIG. 1 is shown. For the sake of simplicity, the various features/components/functions illustrated in the schematic boxes of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded. In some embodiments, some or all of the components depicted in FIG. 2 may also be used in implementations of one or more of the access points 106a-e and/or 104a-c illustrated in FIG. 1.

As shown, the mobile device 200 may include one or more local area network transceivers 206 that may be connected to one or more antennas 202. The one or more local area network transceivers 206 comprise suitable devices, circuits, hardware, and/or software for communicating with and/or detecting signals to/from one or more of the WLAN access points, such as the access points 106a-e, depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The mobile device 200 may also include, in some implementations, one or more wide area network transceiver(s) 204 that may be connected to the one or more antennas 202. The wide area network transceiver 204 may comprise suitable devices, circuits, hardware, and/or software for communicating with and/or detecting signals from one or more of, for example, the access points 104a-c illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, WCDMA, LTE etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure.

As further illustrated in FIG. 2, the example mobile device 200 includes one or more sensors 212 coupled to a controller/processor 210. For example, the sensors 212 may include motion sensors to provide relative movement and/or orientation information (which is independent of motion data derived from signals received by the wide area network transceiver(s) 204, the local area network transceiver(s) 206, and/or the SPS receiver 208). By way of example but not limitation, the motion sensors may include an accelerometer 212a, a gyroscope 212b, and a geomagnetic (magnetometer) sensor 212c (e.g., a compass), any of which may be implemented based on micro-electro-mechanical-system (MEMS), or based on some other technology. The one or more sensors 212 may further include an altimeter (e.g., a barometric pressure altimeter) 212d, a thermometer (e.g., a thermistor) 212e, an audio sensor 212f (e.g., a microphone) and/or other sensors. The output of the one or more sensors 212 may be provided as part of the data (along with antenna information for nodes communicating with the mobile device 200 and/or with such data as location data) transmitted to a remote device or server (via the transceivers 204 and/or 206, or via some network port or interface of the mobile device 200), for storage or further processing (e.g., antenna information for an AP communicating with the mobile device 200 may be inferred by matching sensor data measured by the sensors of the mobile device with records that are maintained at the server and that include antenna information for various wireless nodes and associated sensor data that was previously obtained by one or more wireless devices). As further shown in FIG. 2, in some embodiments, the one or more sensors 212 may also include a camera 212g (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 210 may be connected to the local area network transceiver(s) 206, the wide area network transceiver(s) 204, the SPS receiver 208 and the one or more sensors 212. The processor may include one or more microprocessors, microcontrollers, and/or digital signal processors that provide processing functions, as well as other calculation and control functionality. The processor 210 may be coupled to storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus. Further details regarding an example embodiment of a processor or computation system, which may be similar to the processor 210, are provided below in relation to FIG. 11.

A number of software modules and data tables may reside in memory 214 and may be utilized by the processor 210 in order to manage both communications with remote devices/nodes (such as the various nodes and/or the server 110 depicted in FIG. 1), perform positioning determination functionality, and/or perform device control functionality. The software module can be configured to perform the various processes illustrated in the figures. The functionality of the software modules can alternatively be implemented as hardware components of the mobile device 200. Accordingly, the processor and/or the hardware implementation of the functionality of these modules can provide the means for performing the various processes described herein.

The application module 218 may be a process running on the processor 210 of the mobile device 200, which requests position information from the positioning module 216. Applications typically run within an upper layer of the software architectures, and may include indoor navigation applications, shopping applications, location aware service applications, etc. The positioning module 216 may derive the position of the mobile device 200 using information derived from various receivers and modules of the mobile device 200, e.g., based on measurements performed by the RSSI module and/or the RTT module. The positioning and application modules may also perform various processes (e.g., determine location estimates, perform navigation operations) based, in part, on ranging information associated with the transmitter(s) with which the mobile device is communicating (as discussed below in greater detail). For example, in implementations where the mobile device collects measurements from one or more access points, ranging information for the one or more access points may be used to derive positioning data. Furthermore, the positioning module 216 can be configured to perform the functions of the various processes illustrated in the figures unless otherwise specified.

As further illustrated, the mobile device 200 may also include assistance data storage 224, where assistance data (which may have been downloaded from a remote server), such as map information, data records relating to location information in an area where the device is currently located, antenna information obtained for wireless nodes in the vicinity or range of the mobile device 200, etc., is stored. In some embodiments, the mobile device 200 may also be configured to receive supplemental information that includes auxiliary position and/or motion data which may be determined from other sources (e.g., from the one or more sensors 212). Such auxiliary position data may be incomplete or noisy, but may be useful as another source of independent information for estimating the position of the mobile device 200, or for performing other operations or functions. Supplemental information may also include, but not be limited to, information that can be derived or based upon Bluetooth signals, beacons, RFID tags, and/or information derived from a map (e.g., receiving coordinates from a digital representation of a geographical map by, for example, a user interacting with a digital map). The supplemental information may optionally be stored in the storage module 226 schematically depicted in FIG. 2.

The mobile device 200 may further include a user interface 250 providing suitable interface systems, such as a microphone/speaker 252, a keypad 254, and a display 256 that allows user interaction with the mobile device 200. The microphone/speaker 252 (which may be the same or different from the audio sensor 212f) provides for voice communication services (e.g., using the wide area network transceiver(s) 204 and/or the local area network transceiver(s) 206). The keypad 254 may comprise suitable buttons for user input. The display 256 may include a suitable display, such as, for example, a backlit LCD display, and may further include a touch screen display for additional user input modes.

Figure 3:
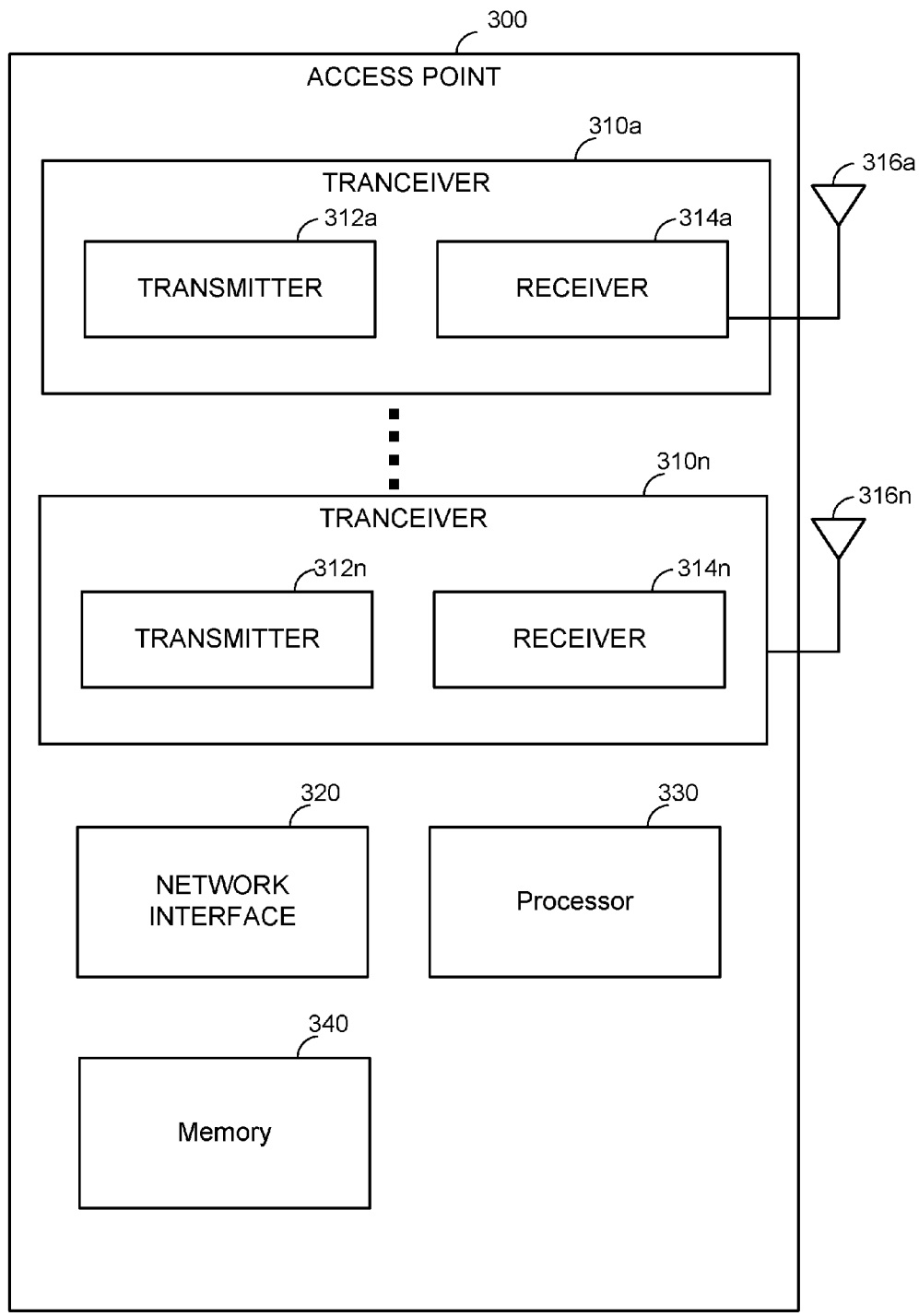
FIG. 3 is a schematic diagram of an example node (e.g., an access point), in accordance with certain example implementations.

With reference now to FIG. 3, a schematic diagram of an example node 300, such as access point, which may be similar to, and be configured to have a functionality similar to that, of any of the various nodes depicted in FIG. 1 (e.g., the access points 104a-c, 106a-e, and/or the server 110), is shown. The node 300 may include one or more transceivers 310a-n electrically coupled to one more antennas 316a-n for communicating with wireless devices, such as, for example, the mobile devices 108 or 200 of FIGS. 1 and 2, respectively. Each of the transceivers 310a-310n may include a respective transmitter 312a-n for sending signals (e.g., downlink messages) and a respective receiver 314a-n for receiving signals (e.g., uplink messages). The node 300 may also include a network interface 320 to communicate with other network nodes (e.g., sending and receiving queries and responses). For example, each network element may be configured to communicate (e.g., wired or wireless backhaul communication) with a gateway, or other suitable entity of a network, to facilitate communication with one or more core network nodes (e.g., any of the other access points shown in FIG. 1, the server 110, and/or other network devices or nodes). Additionally and/or alternatively, communication with other network nodes may also be performed using the transceivers 310a-n and/or the respective antennas 316a-n.

The node 300 may also include other components that may be used with embodiments described herein. For example, the node 300 may include, in some embodiments, a processor/controller 330 (which may be similar to the processor 210 of FIG. 2) to manage communications with other nodes (e.g., sending and receiving messages) and to provide other related functionality. The controller 330 may be implemented, in some embodiments, as a processor-based device, with a configuration and functionality similar to that shown and described in relation to FIG. 11. In some embodiments, the node may also include one or more sensors (not shown), such as any of the one or more sensors 212 of the mobile device 200 depicted in FIG. 2.

The processor 330 may be coupled to storage media (e.g., memory) 340 for storing data and software instructions for executing programmed functionality within the mobile device. The memory 340 may be on-board the processor 330 (e.g., within the same IC package), and/or the memory may be external memory to the processor and functionally coupled over a data bus. Further details regarding an example embodiment of a processor or computation system, which may be similar to the processor 330, are provided below in relation to FIG. 11.

A number of software modules and data tables may reside in memory 340 and may be utilized by the processor 330 in order to manage both communications with remote devices/nodes (such as the various nodes and/or the server 110 depicted in FIG. 1), perform positioning determination functionality, and/or perform device control functionality. The software module can be configured to perform the various processes illustrated in the figures. The functionality of the software modules can alternatively be implemented as hardware components of the node 300. Accordingly, the processor and/or the hardware implementation of the functionality of these modules can provide the means for performing the various processes described herein.

Figure 4:
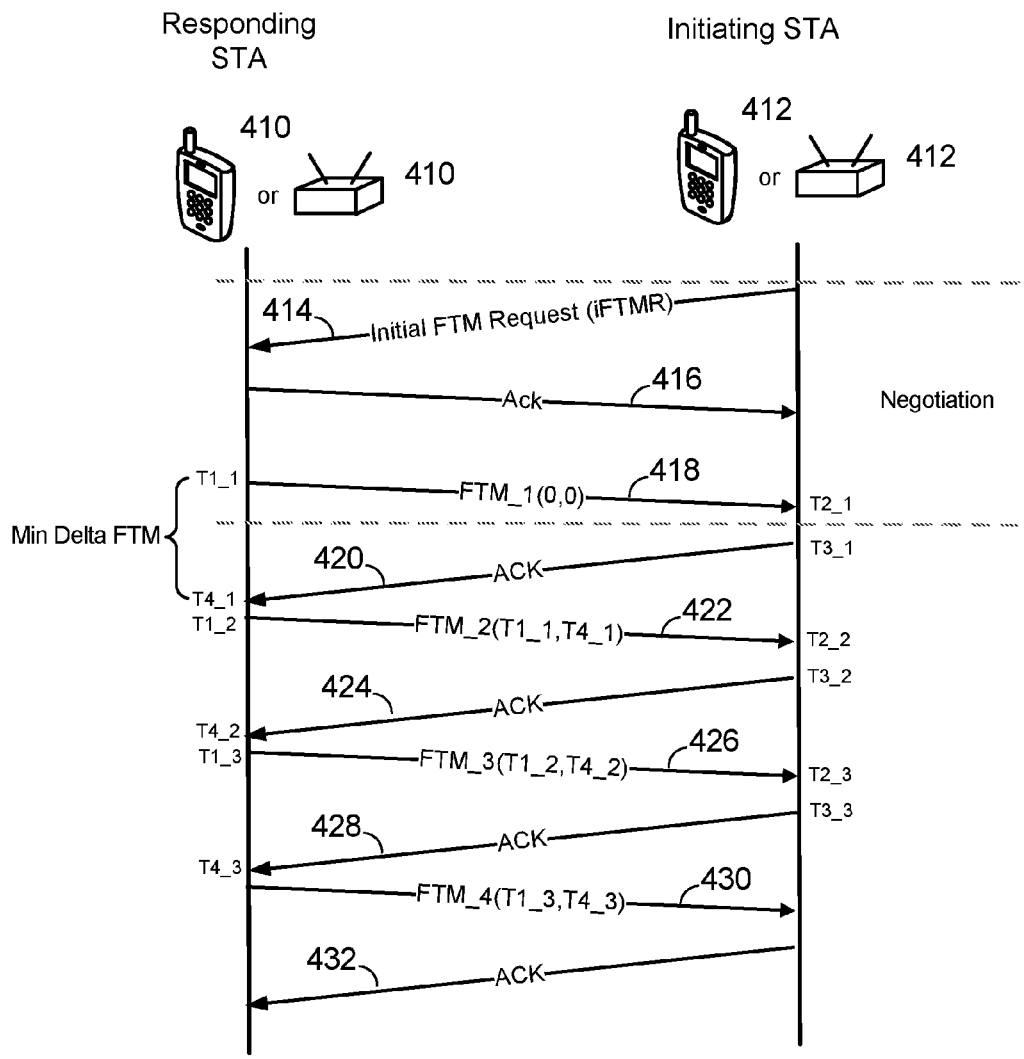
FIG. 4 is a signal flow diagram illustrating example interactions between two stations to conduct an FTM session in accordance with certain example implementations.

FIG. 4 is a signal flow diagram illustrating example interactions 400 between two stations to conduct an FTM session is shown. In the example illustrated in FIG. 4, the initiating station 412 requests that a FTM session having a finite duration be established with the responding station 410. The initiating station 412 may also be conducting or may establish one or more infinite FTM sessions with other responding stations (not shown) during the process illustrated in FIG. 4 in order to obtain ranging information from multiple other stations that can be used to determine a location of the initiating station 412. The initiating station 412 and the responding station 410 can be similar to any of the devices 108, 104a-c, 106a-e, 200, or 300 depicted in FIG. 1, 2, or 3. For example, the initiating station 412 can comprise a mobile device, such as mobile device 200 illustrated in FIG. 2, or the initiating station 412 can comprise a wireless access point, such as the node 300 illustrated in FIG. 3. The responding station 410 can comprise a mobile device, such as mobile device 200 illustrated in FIG. 2, or the responding station 410 can comprise a wireless access point, such as the node 300 illustrated in FIG. 3.

The interactions 400 include an initial FTM Request message 414 (iFTMR), which can be configured formatting according to the FTM protocol discussed herein (e.g. the request message can be an FTMR message) to request a FTM Session between the initiating station 412 and the responding station 410. The iFTMR message 414 can be formatting according to the example messages illustrated in FIGS. 6 and 8 as discussed below. The iFTMR message can define one or more parameters that sets limits on the duration and the amount of FTM data that is exchanged during the FTM session. For example, the iFTMR message 414 can include a parameter value indicating a number of FTM burst instances to be included in the FTM session, a burst duration parameter indicated a requested burst duration of a burst instance of the FTM session, and/or a number of frames per burst parameter can define a requested number of FTM frames to be included in each burst. Once the requested parameters for the FTM session are satisfied, the FTM session can be terminated by the responding station 410, and the initiating station 412 would need to renegotiate a new session with the responding station 410. In the example illustrated in FIG. 4, the negotiation phase includes the iFTMR message 414 from the initiating station 412 and the messages 416 and 418 from the responding station 410. An example message 600 illustrated in FIG. 6, and discussed in detail below, can be used to implement the iFTMR message 414.

The responding station 410 can send an acknowledgement message 416 to the initiating station 412 in response to receiving the iFTMR message 414 from the initiating station 412. The responding station 410 can then send an FTM measurement message 418 that provides the response of the initiating station 412 to the iFTMR message 414. The FTM measurement message 418 can indicate whether the request to initiate the FTM session with the responding station 410 was successful or whether the request failed or the responding station 410 was incapable of establishing the FTM session with the initiating station 412. In the example illustrated in FIG. 4, it is assumed that the request to establish the FTM session between the initiating station 412 and the responding station 410 was successful. The FTM measurement message 418 can also include information indicative of whether the responding station accepted the FTM session parameter settings proposed by the initiating station 412 in the iFTMR message 414. Messages 414, 416, and 418 can collectively be referred to as the negotiation phase of the FTM session. In some embodiments, the negotiation phase of the FTM session can include additional messages not illustrated in this example or can omit some of the messages illustrated herein. Furthermore, in some embodiments, one or more of the messages illustrated as being separate messages can be combined. For examples, messages 416 and 418 can be combined in some embodiments. The negotiation phase between the initiating station 412 and the responding station 410 will be need to be repeated should the FTM session be terminated by the responding station once the FTM session parameters either directly or indirectly related to session duration have been satisfied.

The FTM measurement message 418, and the subsequent FTM measurement messages 422, 426, and 430 illustrated in FIG. 4, can be formatted at least in part according to the examples illustrated in FIG. 7 discussed below. The format of the FTM measurement messages are not limited to the examples illustrated in FIG. 7 and other message formats can also be used.

The initiating station 412 can respond to a FTM measurement message received from the responding station 410 with an acknowledgement message. For example, the initiating station 412 can respond with an acknowledgement message 420 in response to the FTM measurement message 418, with an acknowledgement message 424 in response to the FTM measurement message 422, with an acknowledgement message 428 in response to the FTM measurement message 426, and with an acknowledgement message 432 in response to the FTM measurement message 430.

The FTM measurement messages sent by the responding station 410 can include time of departure (TOD) information that includes a timestamp representing a time at which previous FTM measurement message departed from the responding station 410 to the initiating station 412. For example, the FTM measurement message 422 can include TOD information representing a time at which the FTM measurement message 418 departed from the responding station 410 to the initiating station 412. The FTM measurement messages sent by the responding station 410 can include time of arrival (TOA) information that includes a timestamp representing a time at which a previous message arrived from the initiating station 412 responsive to the initiating station 412 receiving the FTM measurement message 418. For example, the FTM measurement message 422 sent by the responding station 410 can include time of arrival (TOA) information for the acknowledgement message 420 at the responding station 410. The TOD and TOA information can both contain values representative of time expressed in units of, for example, 0.1 ns (although other timing/resolution units can be used instead). The contents of the FTM measurement messages can be used to determine a range between the initiating station 412 and the responding station 410. The FTM measurement messages can be of a similar format as the message 700 illustrated in FIG. 7 and discussed in detail below. The format of the FTM measurement messages are not limited to the example illustrated in FIG. 7, and other message formats can also be used.

The FTM session illustrated in FIG. 4 terminates with acknowledgement message 432. One or more of the FTM parameters provided by the iFTMR message 414 can have been satisfied and responding station 410 can terminate the session. Alternatively, the initiating station 412 may have terminated the session by sending the second wireless device an FTM request message in which the value of the trigger field set to zero ('0'). The first wireless device and the second wireless device can be configured to recognize other parameters and value of said parameters as an indication that an FTM session should be terminated.

Figure 5:
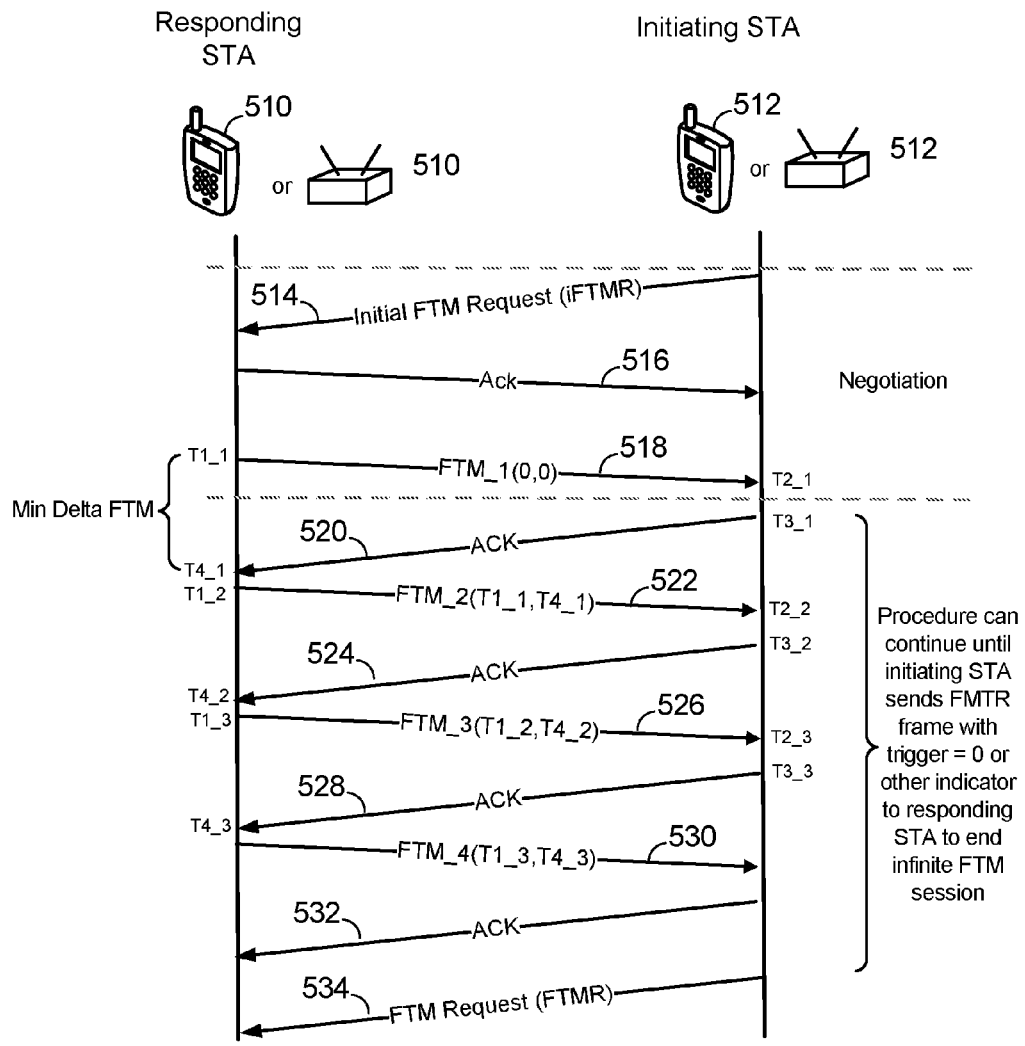
FIG. 5 is a signal flow diagram illustrating example interactions between two stations to conduct an FTM session in accordance with certain example implementations.

FIG. 5 is a signal flow diagram illustrating example interactions between two stations to conduct an FTM session is shown. In the example illustrated in FIG. 5, the initiating station 512 requests that an infinite FTM session be established with the responding station 510. The initiating station 512 can also be conducting or can establish one or more infinite or non-infinite FTM sessions with other responding stations (not shown) during the process illustrated in FIG. 5 in order to obtain ranging information from multiple other stations that can be used to determine a location of the initiating station 512. The responding station 510 can be similar to the responding station 410 of FIG. 4 and the initiating station 512 can be similar to the initiating station 412 of FIG. 4. The initiating station 512 can be a mobile device, such as mobile device 200 illustrated in FIG. 2, or the initiating station 512 can be a wireless access point, such as the node 300 illustrated in FIG. 3. The responding station 510 can be a mobile device, such as mobile device 200 illustrated in FIG. 2, or the responding station 510 can be a wireless access point, such as the node 300 illustrated in FIG. 3.

In contrast with the example process illustrated in FIG. 4, the initiating station 512 illustrated in FIG. 5 can negotiate an infinite FTM session with the responding station 510. The iFTMR message 514 can be formatting according to the example messages illustrated in FIGS. 6 and 8 as discussed below. The iFTMR message 514 illustrated in the FIG. 5 can be used to set up the infinite FTM session with the responding station 510 by setting one or more specific parameters in the iFTMR message 514 that indicate to the responding station 510 that the initiating station 512 is requesting an infinite FTM session. For example, the initiating station 512 can be configured to set the one or more specific parameter values to a "No Preference" value that indicates to the responding station 510 that the initiating station 512 is attempting to establish an infinite FTM session with the responding station 510. For example, the iFTMR message 514 can set the number of FTM burst instances parameter, the burst duration parameter, and the number of frames per burst parameter to "No Preference" values indicative that the initiating station 512 is requesting an infinite FTM session. For example, the number of FTM burst instances parameter can be set to 15, the burst duration parameter can be set to 15, and the number of FTM frames per burst can be set to zero ('0'). In other embodiments, other "No Preference" values can be defined as other suitable values that indicate to the responding station 510 that initiating station is requesting an infinite FTM session.

Similar the example illustrated in FIG. 4, the initiating station 512 in the process illustrated in FIG. 5 can respond to a FTM measurement message received from the responding station 510 with an acknowledgement message. For example, the initiating station 512 can respond with an acknowledgement message 520 in response to the FTM measurement message 518, with an acknowledgement message 524 in response to the FTM measurement message 522, with an acknowledgement message 528 in response to the FTM measurement message 526, and with an acknowledgement message 532 in response to the FTM measurement message 530. The FTM measurement messages can be of a similar format as the message 700 illustrated in FIG. 7 and discussed in detail below. The format of the FTM measurement messages are not limited to the example illustrated in FIG. 7, and other message formats can also be used.

Figure 6:
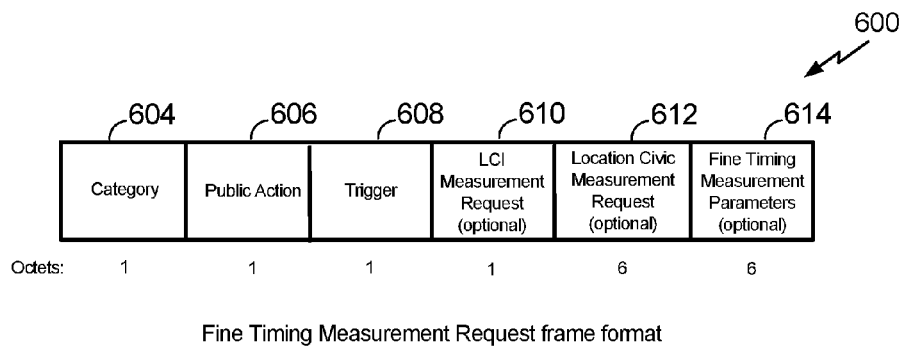
FIG. 6 is a schematic diagram of an example message 600 that the initiating station may send as at least part of initial FTM request message.

The initiating station 512 can be configured to send an FTM request message 534 similar to that of iFTMR message 514 to the responding station 510 to indicate that the initiating station wishes to terminate the infinite FTM session. An example of such a message is illustrated in FIG. 6 and is discussed below. The responding station 510 can be configured to send FTM measurement messages to the initiating station 512 according to the parameters of the FTM session that were established during the negotiation phase until the initiating station 512 sends an FTM request message to the responding station 510 indicating that the initiating station 512 would like to terminate the FTM session. The responding station 510 can be configured to continue to provide FTM measurement messages until the FTM request message 534 is received from the initiating station 512. The number of FTM measurement messages send by the responding station 510 during an infinite FTM session may vary from the example illustrated in FIG. 5, and such an infinite FTM session may include more or less messages depending upon the duration of the session, the frequency at which the responding station 510 is configured to transmit the FTM session messages, and/or other factors.

The responding station 510 can be configured to include Time Synchronization Function (TSF) information in (e.g., each of) the FTM measurement messages transmitted to the initiating station 512. The TSF information can be used to keep a timer of the initiating station 512 and a timer of the responding station 510 in synch. One aspect of the FTM session is the exchange of Time of Departure (TOD) and Time of Arrival (TOA) information associated with various messages exchanged during the FTM session. The accuracy of this TOA and TOD information and the ranging measurements determined therefrom are dependent on these timers of the initiating station 512 and a timer of the responding station 510 staying in synch. In a conventional FTM session, the TSF information can be included in the first frame of each burst of frames of the FTM session. However, this approach may not be sufficient for an infinite FTM session such as that illustrated in FIG. 5. In the approach illustrated in FIG. 5, the responding station 510 is configured to provide the TSF information in every FTM measurement message (referred to herein as an FTM frame) sent to the initiating station 512, which the initiating station can use to keep the timer of the initiating station 512 in synch with the timer of the responding station 510. An infinite FTM session can be of an unknown and protracted duration, the timer of the initiating station 512 may potentially drift out of synch from the timer of the responding station 510. By including the TSF information, e.g., in each of the FTM measurement messages, the initiating station 512 is more likely to be able to keep its timer in synch with that of the responding station 510. The responding station 510 can also be configured to provide the TSF information to the initiating station 512 at regular intervals. For example, the responding station 510 may be configured to provide the TSF information in every nth FTM measurement message, where n is an integer greater than or equal to 1. The responding station 510 may also be configured to provide the TSF information to the initiating station 512 in the next FTM measurement message after a predetermined period of time has elapsed since the TSF information was last sent to the initiating station 512.

FIG. 6 is a schematic diagram of an example message 600 that the initiating station can send as at least part of initial FTM request message (also referred to herein as an initial FTM request frame) to a responding station in order to request an FTM session be established between the initiating station and the responding station. Referring to the example process illustrated in FIG. 4, the initiating station 412 can be configured to send an initial FTM request message 414 to the responding station 410 to request that an FTM session be established between the initiating station 412 and the responding station 510, and the initial FTM request message 414 can be a formatted similarly to the message 600 illustrated in FIG. 6. Similarly, referring to the example process illustrated in FIG. 5, the initiating station 512 can be configured to send an initial FTM message 514 to the responding station 510 to request that an FTM session be established between the initiating station 512 and the responding station 510, and the initial message 514 can comprise a formatted similarly to the message 600 illustrated in FIG. 6.

The message 600 includes a number of fields that can be used to advertise the fine timing measurement configuration being requested by the initiating station. The message 600 can include a category field 604, a public action field 606, a trigger field 608, an LCI measurement request field 610, a location civic measurement request field 612, and an FTM parameters field 614. For example, the category field 604 can include, in some embodiments, a value specifying that the reply message, and the data contained therein, are for facilitating "Wireless Network Management." The category field 604 can, alternatively, specify a value corresponding to a category of "public." Other category values for the category field 604 can also be used. The public action field can be used to allow inter-base station subsystem (BSS) and unassociated-station (STA) communications, Generic Advertising Services (GAS) to enable STAs to discover the availability of desired network services, and other functionality that is outside of the scope of this disclosure.

The trigger field 608 can be set by the initiating station to indicate that the initiating station requests that the responding station start or continue sending FTM frames to the initiating station. The trigger field 608 can also be set by the initiating station to indicate to the responding station that the responding station should stop sending FTM frames to the initiating station. The initiating station can be configured to send an FTM request message comprising a message 600 to the responding station with the trigger value set to '1' (one) to initiate either a conventional FTM session having a finite duration or an FTM session having an infinite duration. The initiating station can be configured to send an FTM request message comprising a message 600 with the trigger value set to '0' (zero) to indicate that the initiating station would like to terminate an infinite FTM session with the responding station.

The LCI measurement request field 610 and the location civic measurement request field 612 are optional. The initiating station can populate the LCI measurement request field 610 in order to request Location Configuration Information from the responding station. The initiating station can populate the location civic measurement request field 612 in order to request an address of the responding station.

The FTM parameters field 614 can be populated using a format similar to the message 800 illustrated in FIG. 8 and described in detail below. The FTM parameters field 614 can be optional for establishing a conventional FTM session with a responding station, such as in the example illustrated in FIG. 4, where the FTM session is to have a finite duration. However, the FTM parameters field 614 can be made mandatory when the initiating station is requesting an infinite FTM session, such as in the example illustrated in FIG. 5. The FTM parameters field 614 can be populated with a predetermined combination of FTM session parameters by the initiating station that the responding station can be configured to recognize as being a request for an infinite FTM session. The values incorporated in the FTM parameters field 614 can be values that are defined by the FTM protocol for use in defining the parameters of a conventional FTM session having a finite duration, such that this approach is backward compatible with responding stations that are not configured to provide for infinite FTM sessions. The responding station not configured to provide for infinite FTM sessions could establish a conventional FTM session having a finite duration with the initiating station, and the initiating station can be configured to determine whether to continue the conventional FTM session or to terminate the FTM session.

Figure 7:
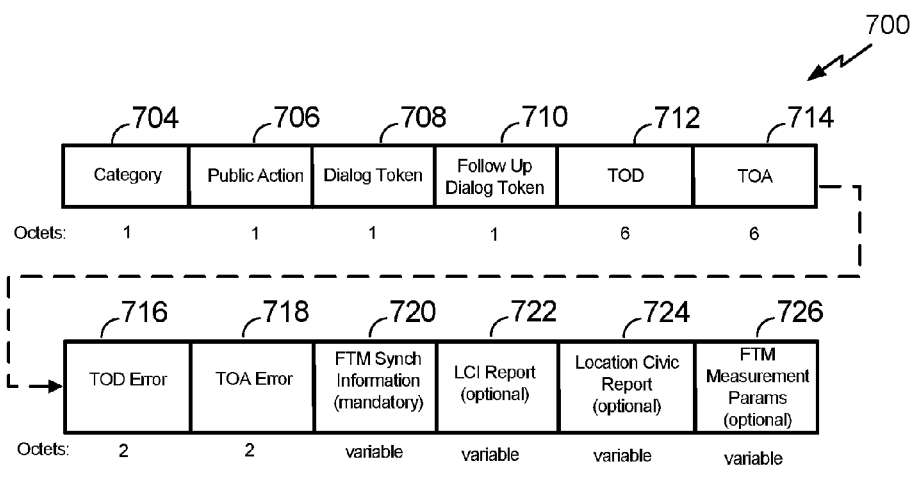
FIG. 7 is a schematic diagram of an example FTM measurement message that a station may send as part of a FTM session.

FIG. 7 is a schematic diagram of an example message 700, which can be formatted and populated with data in a manner similar to the reply message 422 of FIG. 4 or the reply message 522 of FIG. 5 is shown in FIG. 5. The schematic of the example message 700 also includes markings indicating possible fields lengths of the various fields of the replay message 700.

The message 700 includes a category field 704 with a value indicating the general use for which the message 700 is directed. For example, the category field 704 can include a value specifying that the reply message, and the data contained therein, are for facilitating "Wireless Network Management." The category field 704 can, alternatively, specify a value corresponding to a category of "public." In one implementation, the value of "public" can be represented by the number value "4" (four). The public action field 706 value can be used to indicate whether a messages comprises an FTM request frame or FTM measurement message frame. In one embodiment, a value of '32' can be used to indicate that a message comprises an FTM request frame and a value of '33' can be used to indicate that the message comprises an FTM measurement frame. Other implementations can use other values instead of the values discussed herein.

As further shown, the example message 700 can include a public action field 706 to hold a value indicating the type of action frame that is to be communicated, and thus the formatting to be followed for the particular action frame specified. For example, in some embodiments, a value of '33' specified in the public action field 654 indicates that the frame is for fine timing measurements. The Dialog Token field 708 can be set to a non-zero value chosen by the responding station (e.g., the responding station 410 in the example of FIG. 4 or the responding station 510 in the example of FIG. 5) to identify the transaction and/or to identify the Fine Timing Measurement frame as the first of a message pair, with the second or follow-up Fine Timing Measurement frame to be sent later. In some embodiments, the dialog token field can be set to zero ('0') to specify the end of an FTM session or FTM measurement exchange. A follow-up dialog token field 710 can be set to the non-zero value of the dialog token field of a previously transmitted fine timing measurement frame to indicate that it is the follow-up fine timing measurement frame. The follow-up dialog token can be set to a value of zero ('0') to indicate that the fine timing measurement frame is not a follow up to a previously transmitted Fine Timing Measurement frame (e.g., it is a first frame of a sequence).

With continued reference to FIG. 7, the example message 700 can include a time of departure (TOD) field 712 that generally contains a timestamp representing the time at which a previous message from the responding station departed to the initiating device. Thus, if the reply message 422 of FIG. 7 was preceded by an earlier FTM message 418 (in the example of FIG. 4) sent by the initiating station 412 to the responding station 410, the TOD included in the message 422 would be the time at which that earlier message 418 departed the initiating station 412 to the responding station 410. As further shown in FIG. 7, the message 700 can also include a time-of-arrival (TOA) field 714 containing a timestamp representing the time at which a message from the first wireless device, responsive to an earlier message sent by the responding device (i.e., responsive to the earlier FTM message 418 sent by the initiating station 412) arrived at the responding device (i.e., arrived at the initiating station 412). Thus, for example, the time of arrival of an ACK message 420, sent in response to the earlier sent FTM message 418, at the initiating station 412 could be the value populated into the TOA field 714 of the message 700. The TOD and TOA fields can both contain values representative of time expressed in units of, for example, 0.1 ns (although other timing/resolution units can be used instead).

In some embodiments, the message 700 can further include a TOD Error field 716 specifying an upper bound for the error in the value specified in the TOD field 712. For example, a value of 2 in the TOD Error field 716 can indicate that the value in the TOD field 712 has a maximum error of ±0.02 ns. TOA Error field 718 can contain an upper bound for the error in the value specified in the TOA field 714. For instance, a value of 2 in the TOA Error field 718 indicates that the value in the TOA field 714 has a maximum error of, for example, ±0.02 ns. Additionally, an LCI Report field 722 can contain a latitude/longitude coordinate values, a Location Civic Report field 724 can contain an address of the initiating station 412, and a Fine Timing Measurement Parameters field 726 can include different settings values are requested by the initiating STA and allocated by the responding STA. The value of the Fine Timing Measurement Parameters field 726 should be set in the initial FTM Measurement Frame (e.g., message 418 in the example illustrated in FIG. 4 or message 518 illustrated in the example illustrated in FIG. 5) and indicate the FTM value allocated by the responding station.

The FTM synchronization information field 720 can be used by the responding station (e.g., responding station 410 or 510) to provide Time Synchronization Function (TSF) information to the initiating device (e.g. initiating station 412 or 512) can use to synchronize a timer of the responding station and the initiating station. In a non-infinite FTM session, such as that illustrated in FIG. 4, the responding station can be configured to populate the FTM synchronization information field 720 in the first frame of each burst of FTM frames of the FTM session. The FTM synchronization information field 720 can include the 4 least significant bytes of the TSF at the responding STA corresponding to the time the responding STA received the last Fine Timing Measurement Request frame from the initiating station with the value of the trigger field equal to "1" (one). The TSF information can also be communicated to the initiating station using another suitable data format and number of bytes of data. An infinite FTM session can be of an unknown and protracted duration, the timer of the initiating station 512 can potentially drift out of synch from the timer of the responding station 510. Accordingly, the responding station can include the TSF information in, e.g., each of, the measurement messages, so that the initiating station 512 is more likely to be able to keep its timer in synch with that of the responding station 510, resulting in more accurate range estimates.

Referring to the example illustrated in FIG. 4, in a conventional non-infinite FTM session, the FTM synchronization information field 720 can be send once at the beginning of the session in response to the responding station 410 receiving the iFTMR message 414 from the initiating station 412 in which the trigger field is set to a value of "1" (one) indicating that the initiating station 412 would like to initiate an FTM session with the responding station 410. As discussed above, the responding station 410 can recognize that the initiating station 412 is requesting a conventional FTM session and not an infinite FTM session based on the FTM parameters included in the iFTMR message 414. The responding station 410 can include a value indicating a time at which the iFTMR message 414 arrived at the responding station 410 in the FTM measurement message 418.

Referring now to the example illustrated in FIG. 5, the initiating station 512 sends an iFTMR message 514 in which the trigger field is set of a value of "1" indicating that the initiating station 512 would like to initiate an FTM session with the responding station 510 and in which other FTM parameters indicate that the initiating station 512 would like to initiate an infinite FTM session with the responding station 510. The responding station 510 can include a value in the FTM synchronization information field 720 indicating a time at which the iFTMR message 514 arrived at the responding station 510 in the FTM measurement message 518. The responding station 510 can include a value in the FTM synchronization information field 720 indicating a time at which the ACK message 520 from the initiating station 512 arrived at the responding station 510 in the FTM measurement message 522. The responding station 510 can repeat this step for each subsequent ACK message received from the initiation station during the infinite FTM session. For example, the responding station 510 can include a value in the FTM synchronization information field 720 indicating a time at which the ACK message 524 from the initiating station 512 arrived at the responding station 510 in the FTM measurement message 526, and the responding station 510 can include a value in the FTM synchronization information field 720 indicating a time at which the ACK message 526 from the initiating station 512 arrived at the responding station 510 in the FTM measurement message 530. These steps can be repeated for the duration of the infinite FTM session. This approach can be used to keep the timers of the responding station 510 and the initiating station 512 synchronized. In a conventional FTM session, such as that illustrated in FIG. 4, the TSF information is exchanged at the beginning of the session, typically during the negotiation phase of the session. When the duration of the session is reached, the session terminates and the initiating station would be required to renegotiate a new session with the responding station, at which time the TSF information would once again be exchanged and the timers of the initiating station and the responding station could be synchronized. However, in an infinite FTM session, the negotiation phase occurs once. If the conventional approach were used for sharing the TSF information, a significant amount of time could pass before the timers of the initiating station and the responding station are synchronized. The technique discussed herein addresses this synchronization problem by including the TSF information in at least the first frame of each burst of frame. The TSF information can also be included in, e.g., each of, the FTM measurement messages sent by the responding station to the initiating station.

Figure 8:
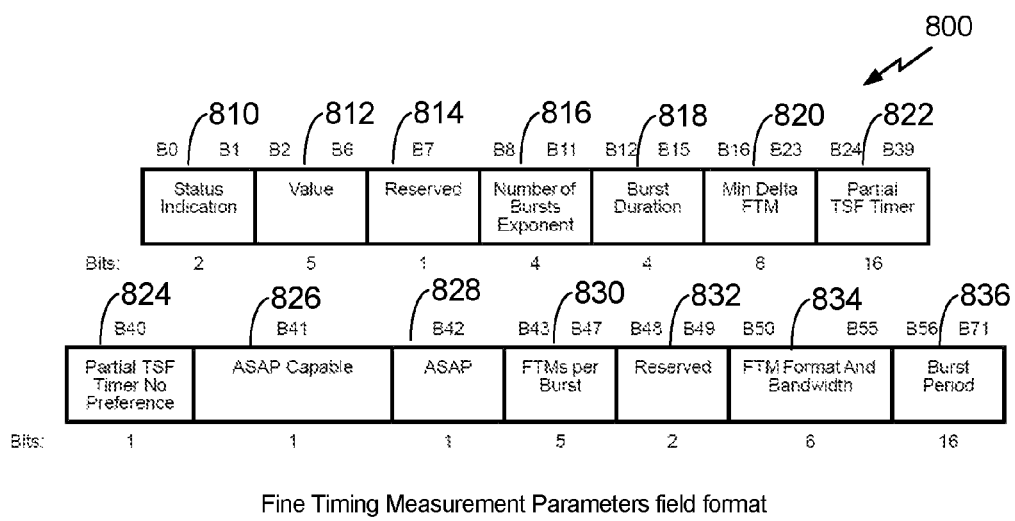
FIG. 8 is a schematic diagram of an example FTM message that a station may send as part of a FTM session.

Referring now to FIG. 8, an example schematic diagram of an example message 800 is provided. The message 800 can be used to populate the FTM parameters field 614 of the message 600, which can be used to populate the initial FTM request message 414 of FIG. 4 or the initial FTM request message 514 of FIG. 5. The message 800 can also be used to populate the FTM measurement parameters field 726 of the message 700 of FIG. 7. The responding station can populate the FTM measurement parameters field 726 using the message 800 in the initial measurement message 418 of FIG. 4 of the initial measurement message 518 of FIG. 5 to indicate to the initiating station the parameters for the FTM session that the responding station has accepted for the FTM session. The parameters accepted by the responding station can be different from those requested by the initiating station depending on the responding stations capabilities and availability to provide the FTM session parameters requested by the initiating station. The message 800 can be used in the example processes illustrated in FIG. 4 to establish a conventional FTM session having a finite duration and the example process illustrated in FIG. 5 to establish an infinite FTM session. Differences regarding how the message 800 can be used in each of these processes will be discussed below.

The message 800 includes a status indication field 810, a value field 812, a reserved field 814, a number of bursts exponent field 816, a burst duration field 818, a min delta FTM field 820, a partial TSF timer field 822, a partial TSF timer no preference field 824, a ASAP capable field 826, an ASAP field 828, a FTMs per burst field 830, a reserved field 832, a FTM format and bandwidth field 834, and a burst period field 836. Reserved fields 814 and 832 are currently not used by the techniques disclosed herein and should not be populated.

The number of bursts exponent field 816, burst duration field 818, and/or the FTMs per burst field 830 can be used by the initiating station to indicate to the responding station that the initiating station would like to establish an infinite FTM session, such as the example illustrated in FIG. 5, versus a conventional FTM session that has a predefined finite duration, such as the example illustrated in FIG. 4. As discussed above, an infinite FTM session is an FTM session that does not have a predefined finite duration, but is not necessarily of unlimited duration. Where a conventional, non-infinite FTM session is desired, the initiating station can be configured to set the one or more of the values of the number of bursts exponent field 816, burst duration field 818, and/or the FTMs per burst field 830 to values that can be used by the responding station to determine when to terminate the FTM session. The responding station can be configured to terminate the FTM session once one or more of the requested FTM session parameters have been satisfied. Where an infinite FTM session is desired, the initiating station can be configured to set the one or more of the values of the number of bursts exponent field 816, burst duration field 818, and/or the FTMs per burst field 830 to a predetermined value that the responding station can be configured to recognize as indicating that the initiating station is requesting an FTM session that does not have a predetermined duration. While the underlying FTM protocol is defined in terms of a finite FTM session, the initiating station and the responding station can be configured to recognize that a predetermined set of values for the number of bursts exponent field 816, burst duration field 818, the FTMs per burst field 830, and/or other fields included in the message 800 are used to indicate that an infinite FTM session has been requested, and the initiating station and the responding station can be configured to support such a session without requiring changes to the FTM protocol. For example, the initiating station can be configured to set the values of the number of bursts exponent field 816, burst duration field 818, the FTMs per burst field 830, and/or other fields included in the message 800 to "No Preference" values that are already defined in the FTM protocol and which indicate that the initiating station does not having a preference as to these parameters and the responding station can determine values for these aspects of the FTM session. Other predetermined combinations of fields and values can be used by the initiating station to indicate to the responding station that an infinite FTM session is desired.

The status indication field 810 can be used to store a value from the responding station 410 or 510 whether an FTM session can be established. The status indication field 810 can be used to indicate whether the request can or cannot be resent if the FTM session could not be established. The value in the status indication field 810 can also be used to indicate that the initiating station 412 or 512 should wait a predetermined amount of time expressed in the value of the value field 812 before attempting to send a new request to the responding station 410. The predetermined amount of time can be expressed in seconds or another suitable unit of measurement for expressing an amount of time that the initiating station 412 or 512 should wait before sending a new request to initiate an FTM session with the responding station 410 or 510.

The number of bursts exponent field 816 can comprise a value that indicates how many burst instances that the initiating station 412 or 512 requests to be included in the FTM session where the message 800 is included in an initial fine timing measurement request (iFTMR) message from the initiating station 412 or 512. The number of burst instances can be expressed as $2\char`\^{}value$, where value represents the value stored in the number of bursts exponent field 816. In some embodiments, a value of '15' can be used to indicate that the initiating station 412 or 512 has no preference as to how many bursts are to be included in the FTM session (The value of 15 represents 2^15 bursts, but can be interpreted by the responding station 410 or 510 include a number of bursts less than this number). As discussed above, the "No Preference" value of the number of bursts exponent field 816 can be used by the initiating station to indicate that an infinite FTM session is being requested.

The burst duration field 818 can comprise a value that indicates the duration of a burst instance. A value of '15' can be used to indicate that the initiating station 412 or 512 has no preference as to the burst duration. As discussed above, the "No Preference" value of the burst duration field 818 can be used by the initiating station to indicate that an infinite FTM session is being requested. In the embodiment illustrated in FIG. 8 the value of the burst duration field 818 can be used to represent the duration of the burst in microseconds. The value of the burst duration field 818 can be represented using other suitable units of time.

The min delta FTM field 820 can comprise a value that indicates a minimum time between consecutive FTM measurement frames. The min delta FTM can be measured from the start of a FTM frame to the start of the following FTM frame. In an embodiment, the value of the field can be expressed in units of 100 microseconds, and a value of zero ('0') can be used to indicate no preference by the initiating station 412 or 512. The value of the min delta FTM field 820 can be represented using other suitable units of time.

The initiating station 412 or 512 can include a value for the partial TSF timer field 822 in the iFTMR messages, such as messages 414 and 514 illustrated in FIGS. 4 and 5, that indicates a preferred time for the start of the first burst instance by the responding station 410 or 510. The responding station 510 can use the partial TSF timer field 822 to indicate the time at which a burst instance will start at the responding station 410 or 510.

The partial TSF timer no preference field 824 can comprise a value indicating whether the initiating station 412 or 512 has a preferred starting time for the first burst instance. A value of zero ('0') can be used to indicate that the initiating station 412 or 512 has no preference as to the start time of the first burst instance.

The ASAP capable field 826 can include a value that indicates that the responding station 410 or 510 is capable of sending a FTM frame as soon as possible, which indicates that the responding station 410 or 510 is capable of capturing timestamps associated with an initial FTM frame and sending these timestamps in the following FTM frame. The ASAP capable field 826 is reserved in the initial FTM frame (e.g., message 414 or 514 in the examples illustrated in FIGS. 4 and 5).

The ASAP field 828 can include a value that indicates that the initiating station 412 or 512 is requesting to start the first burst instance of the FTM session as soon as possible. The initiating station 412 or 512 can set the value of the ASAP field 828 to zero ('0') and the value of the partial TSF timer no preference field 824 to zero ('0') to indicate that the initiating station 412 of 512 requests the start of the first burst instance as specified by the value of the partial TSF timer field 822.

The FTMs per burst field 830 can include a value that indicates how many FTM measurement frames are requested per burst by the initiating station 412 or 512. The initiating station 412 or 512 can indicate that the initiating station does not have a preference as to how many FTM frames are included in each burst by setting the value of this field to zero ('0'). As discussed above, the "No Preference" value of the FTMs per burst field 830 can be used by the initiating station to indicate that an infinite FTM session is being requested.

The FTM format and bandwidth field 834 can include a value that indicates the requested packet format and bandwidth used by all FTM frames in an FTM session as requested by the initiating station 412 or 512. The initiating station 412 or 512 can indicate that the initiating station does not have a preference regarding the FTM format or bandwidth by setting the value of this field to zero ('0').

The burst period field 836 can comprise a value that indicates an interval between consecutive burst instances. In an embodiment, the value of the field can be expressed in units of 100 microseconds, and a value of zero ('0') can be used to indicate no preference by the initiating station 412 or 512. The value of the min delta FTM field 820 can be represented using other suitable units of time.

Figure 9:
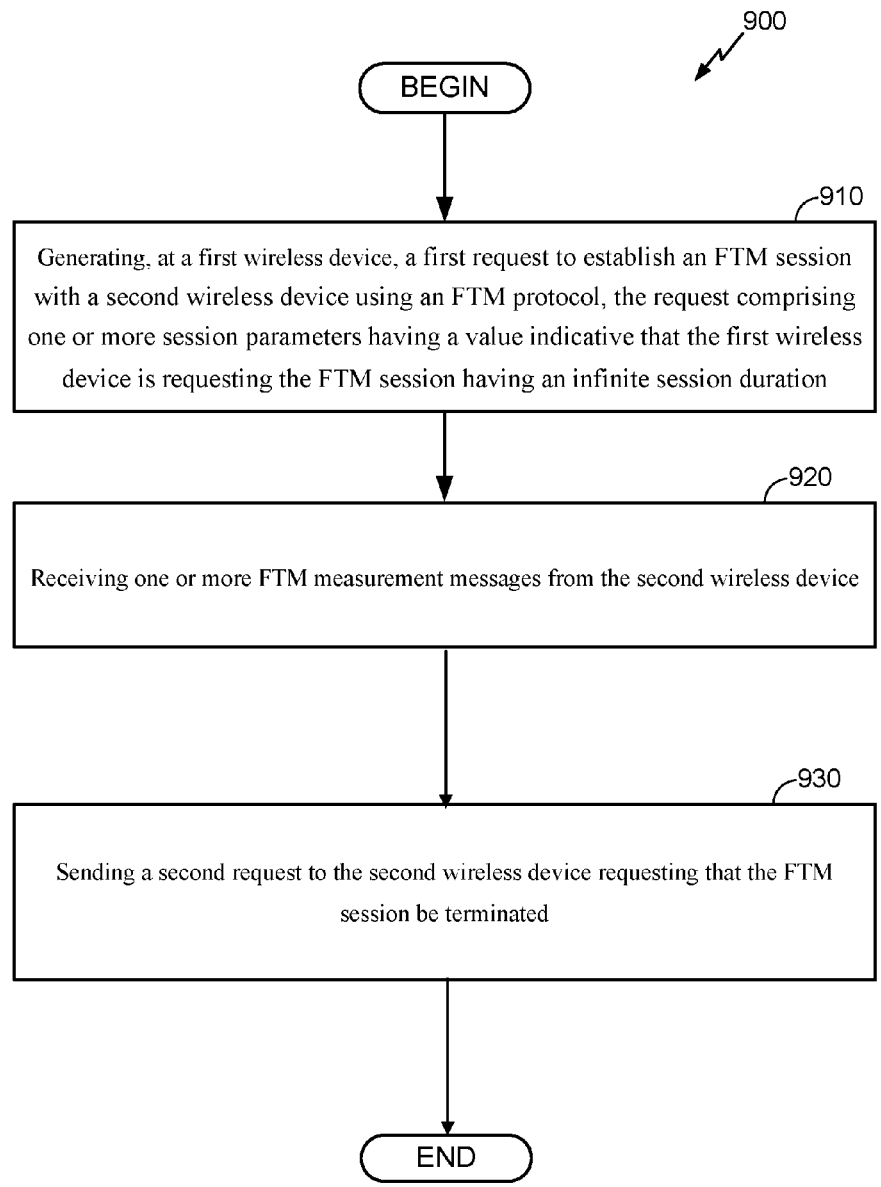
FIG. 9 is a flow diagram of an example process for establishing an FTM session between two wireless devices.

FIG. 9 is a flow diagram of an example process 900 for establishing an FTM session between two wireless devices. The process 900 can be implemented by an initiating station, such as the initiating station 512 of FIG. 5 to establish an infinite FTM session with a responding station, such as the responding station 510 of FIG. 5.

At stage 910, the process 900 includes generating, at a first wireless device, a first request to establish an FTM session with a second wireless device using an FTM protocol, the first request comprising one or more session parameters having a value indicative that the first wireless device is requesting the FTM session have an infinite session duration. Thus, a request can be generated by the first wireless device, the initiating station, to establish an FTM session with a second wireless device, the responding station, using an FTM protocol. The request can include one or more session parameters having a value indicative that the first wireless device is requesting an FTM session having an infinite session duration. The request can include one or more session parameters having a value indicative that the first wireless device is requesting an FTM session having no predefined finite session duration. As discussed above, FTM protocol message can be exchanged between the initiating station and the responding station to establish an FTM session that has a finite duration, but initiating stations and responding stations configured to support infinite FTM sessions can extend the FTM protocol to support infinite FTM sessions without requiring changes to the underlying FTM protocol. The request can comprise an initial FTM request message. The format of the request can be similar to that of the message 600 discussed above. Furthermore, as discussed above, one or more of the parameter values of the request message can be set to predetermined value that can be used to indicate to a second wireless device (the responding station) configured to support infinite FTM sessions, that the first wireless device (the initiating station) has requested an infinite FTM session.

At stage 920, the process 900 includes receiving one or more FTM measurement messages from the second wireless device. The first wireless device can receive one or more FTM messages from the second wireless device. The FTM measurement messages received from the responding station can include messages formatted similar to message 700 illustrated in FIG. 7 and can include information that be used to determine a range of the initiating station from the responding station. The FTM measurement messages can be similar to messages 518, 522, 526, and/or 530 illustrated in FIG. 5. The specific number of FTM measurement messages included in the FTM session can vary from the example illustrated in FIG. 5 and an actual FTM session can include more or less of such FTM measurement messages.

At stage 930, the process 900 includes sending a second request to the second wireless device requesting that the FTM session be terminated. The first wireless device can send a request to the second wireless device to terminate the FTM session. In an embodiment, the first wireless device can be configured to send the second wireless device an FTM request message in which the value of the trigger field set to zero ('0'). The first wireless device and the second wireless device can be configured to recognize other parameters and value of said parameters as an indication that an FTM session should be terminated.

Figure 10:
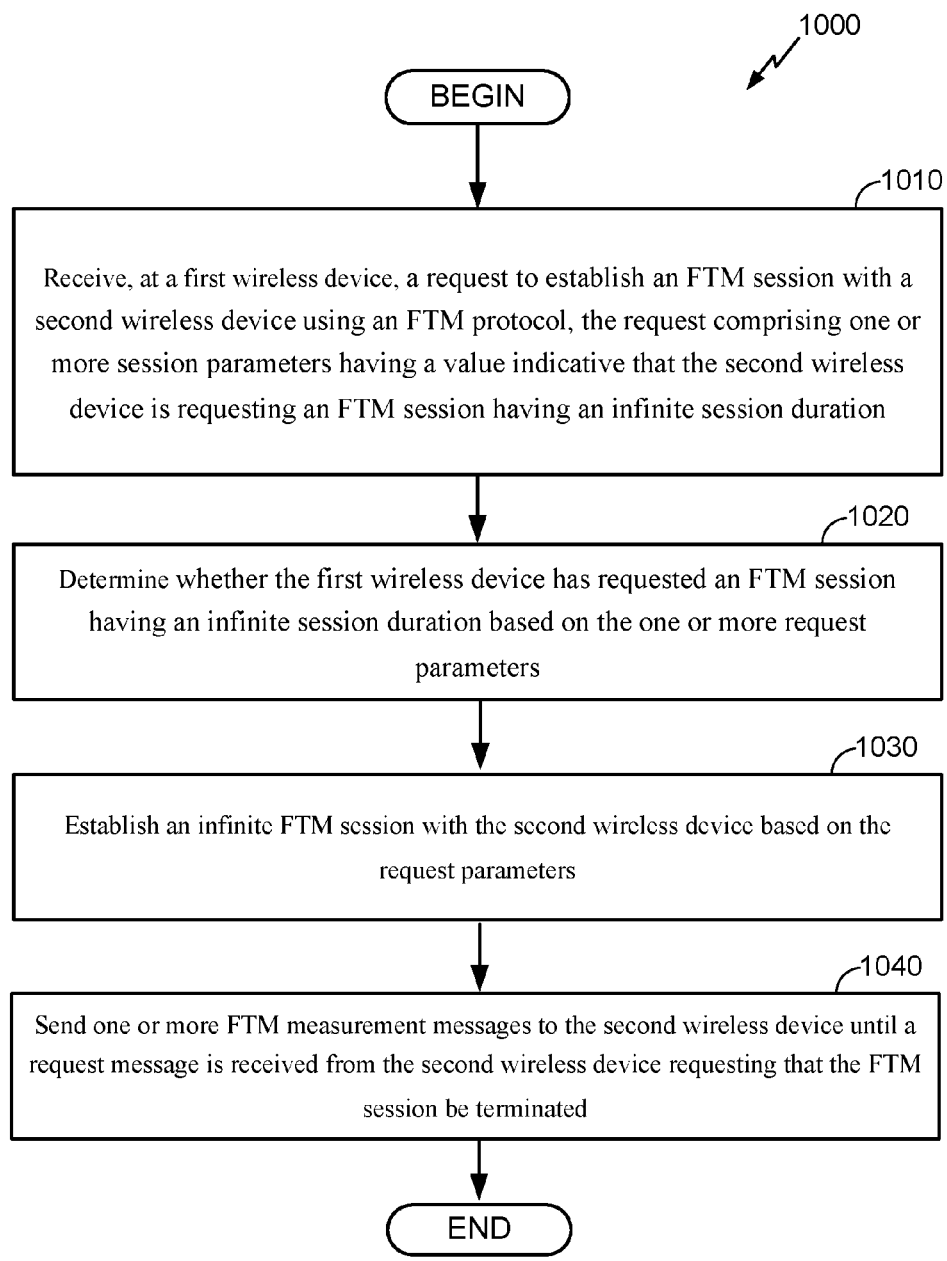
FIG. 10 is a flow diagram of another example process for establishing an FTM session between two wireless devices.

FIG. 10 is a flow diagram of another example process 1000 for establishing an FTM session between two wireless devices. The process 1000 can be implemented by a responding station, such as the responding station 510 of FIG. 5 to establish an infinite FTM session with an initiating station, such as the initiating station 512 of FIG. 5.

A request to establish an FTM session with a second wireless device (the initiating device) using an FTM protocol can be received by the first wireless device (the responding station), the request including one or more session parameters having a value indicative that the first wireless device is requesting an FTM session having an infinite session duration (stage 1010). As discussed above, FTM protocol message can be exchanged between the initiating station and the responding station to establish an FTM session that has a finite duration, but initiating stations and responding stations configured to support infinite FTM sessions can extend the FTM protocol to support infinite FTM sessions without requiring changes to the underlying FTM protocol. The request can comprise an initial FTM request message. The format of the request can be similar to that of the message 600 discussed above, and the request can be part of a negotiation phase between initiating device and the responding device as discussed above with respect to FIGS. 4 and 5. Furthermore, as discussed above, one or more of the parameter values of the request message can be set to predetermined value that can be used to indicate to a responding station configured to support infinite FTM sessions, that the initiating station has requested an infinite FTM session. Examples of such predetermined values that can be used to request an infinite FTM session are discussed above with respect to the example message illustrated in FIG. 8. Other combinations of parameter configurations could be used to indicate that an infinite FTM session is being requested by the second wireless device.

A determination can be made whether the first wireless device has requested an FTM session having an infinite session duration based on the one or more request parameters (stage 1020). The first wireless device can extract the values of the one or more request parameters from the request received from the second wireless device and compare those parameters to an expected parameter or set of parameters indicative of whether the initiating device has requested an infinite FTM session or a conventional FTM session having a finite duration. In an embodiment, the initiating station can be configured to set the values of the number of bursts exponent, burst duration, the FTMs per burst, and/or other parameters included in the message 800 FTM request message to "No Preference" values that are already defined in the FTM protocol and which indicate that the initiating station does not having a preference as to these parameters and the responding station can determine values for these aspects of the FTM session. Other predetermined combinations of fields and values can be used by the initiating station to indicate to the responding station that an infinite FTM session is desired. Furthermore, since the parameters selected fall with the FTM protocol and could be used to establish a conventional FTM session, the usage of such a predetermined combination of fields and values can be backward compatible with a responding station that is not configured to support infinite FTM sessions. In an instance where the first wireless device is such a station that is not configured to support an infinite FTM session, the first wireless device can still establish a conventional FTM session having a finite duration with the second wireless device.

An FTM session can be established with the second wireless device based on the request parameters, such that the FTM session has an infinite session duration (stage 1030). The first wireless device can be configured to send one or more messages to the second wireless device to inform the second wireless device that the first wireless has accepted the request to establish an FTM session received in stage 1010. For example, the first wireless device can be configured to send an acknowledge message, such as the acknowledgement messages 416 and 516 of the processes illustrated in FIGS. 4 and 5 to the second wireless device indicating that the first wireless device has received the initial FTM request message 414 or 514 in which the first wireless device has requested that an FTM session be established between the first wireless device and the second wireless device. The first wireless device can be configured to follow the acknowledgement message 416 or 516 with an FTM measurement message 418 or 518. The FTM measurement message 418 or 518 can include a status indicator that indicates that the first wireless device has accepted the request from the second wireless device to establish an FTM session between the first and second wireless device and can also include an indication of the FTM session parameters accepted by the first wireless station. The first wireless station can accept the FTM session parameters requested by the second wireless station in the FTM session request or can propose alternative FTM session parameters. The second wireless device can accept the FTM session parameters proposed by the first wireless device or can instead terminate the FTM session.

One or more FTM measurement messages can be sent to the second wireless device until a request message is received from the second wireless device requesting that the FTM session be terminated (stage 1040). The first wireless device can be configured to send one or more FTM measurement message to the second wireless device throughout the duration of the infinite FTM session. The one or more FTM messages can comprise a message similar to the message 700 included illustrated in FIG. 7 and the message can comprise FTM parameters which are formatted similar to the message 800 illustrated in FIG. 8. The one or more messages can be transmitted one or more bursts of messages, and each burst can comprise one or more message. The first wireless device can be configured such that each consecutive messages are transmitted at least a minimum apart from one another. This minimum time value can have been specified by the second wireless device in the FTM request message received from the second wireless device in stage 1010. As discussed above, the FTM request message can be formatted similar to the message illustrated in FIG. 8, and the min delta FTM field 820 of the message 800 can be used by the second wireless device to specify an amount of time between consecutive FTM messages from the first wireless device.

The second wireless device can be configured to send the first wireless device a message requesting that the FTM session be terminated. In an embodiment, the first wireless device can be configured to send the second wireless device an FTM request message in which the value of the trigger field set to zero ('0'). An example of such a message is illustrated in FIG. 6. The first wireless device and the second wireless device can be configured to recognize other parameters and value of said parameters as an indication that an FTM session should be terminated.

Figure 11:
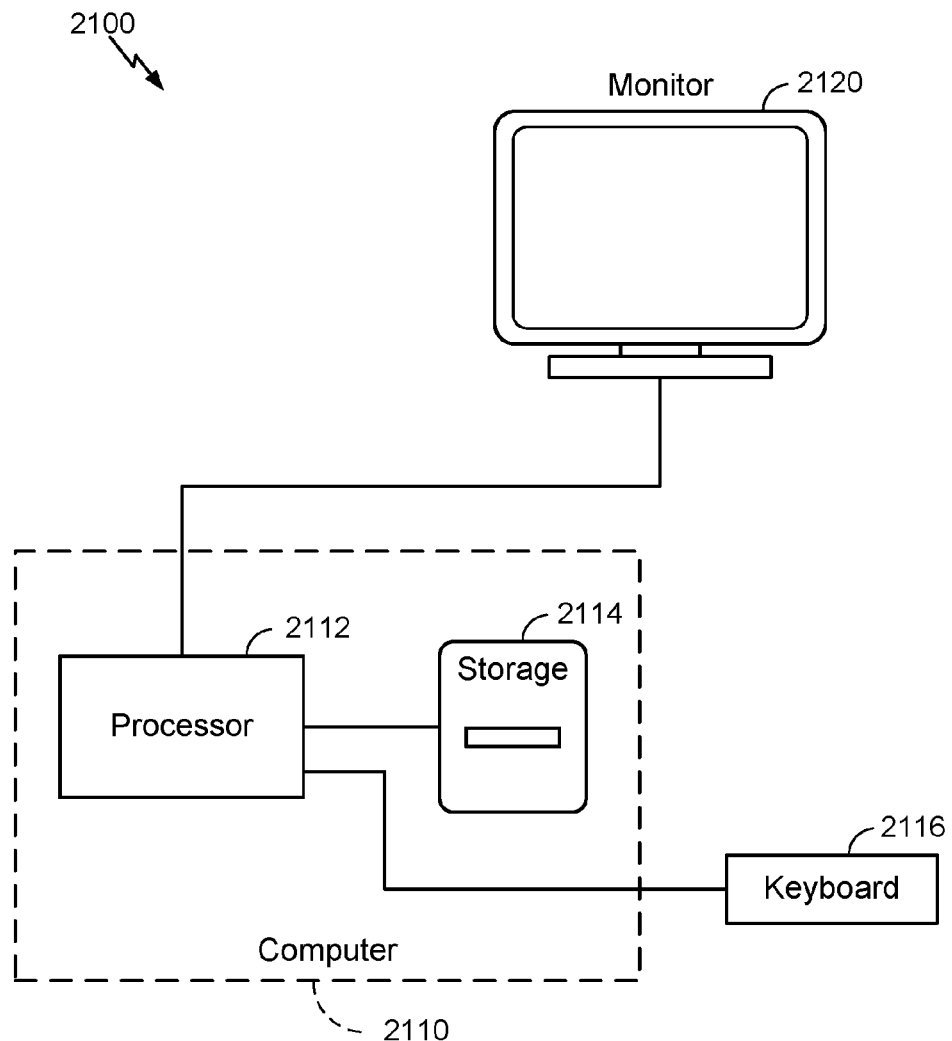
FIG. 11 is a schematic diagram of an example computing system, in accordance with certain example implementations.

Performing the procedures described herein can be facilitated by a processor-based computing system. With reference to FIG. 11, a schematic diagram of an example computing system 2100 is shown. The computing system 2100 can be housed in, for example, a handheld mobile device such as the devices 108 and 200 of FIGS. 1 and 2, respectively, or can comprise part or all of servers, nodes, access points, or base stations such as the access points 104*a-c*, 106*a-e*, or 300 depicted in FIGS. 1 and 3. The computing system 2100 includes a computing-based device 2110 such as a personal computer, a specialized computing device, a controller, and so forth, that typically includes a central processor unit (CPU) 2112. In addition to the CPU 2112, the system includes main memory, cache memory and bus interface circuits (not shown). The computing-based device 2110 can include a mass storage device 2114, such as a hard drive and/or a flash drive associated with the computer system. The computing system 2100 can further include a keyboard, or keypad, 2116, and a monitor 2120, e.g., a CRT (cathode ray tube) or LCD (liquid crystal display) monitor, that can be placed where a user can access them (e.g., a mobile device's screen).

The computing-based device 2110 can be configured to facilitate, for example, the implementation of one or more of the procedures described herein (including the procedures to disseminate, collect, and/or and manage antenna information, the procedures to perform location determination operations, etc.) The mass storage device 2114 can thus include a computer program product that when executed on the computing-based device 2110 causes the computing-based device to perform operations to facilitate the implementation of the procedures described herein. The computing-based device can further include peripheral devices to enable input/output functionality. Such peripheral devices can include, for example, a CD-ROM drive and/or flash drive, or a network connection, for downloading related content to the connected system. Such peripheral devices can also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) can be used in the implementation of the computing system 2100. Other modules that can be included with the computing-based device 2110 are speakers, a sound card, a pointing device, e.g., a mouse or a trackball, by which the user can provide input to the computing system 2100. The computing-based device 2110 can include an operating system.

Computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory can be implemented within the computing-based device 2110 or external to the device. As used herein the term "memory" refers to any type of long term, short term, volatile, nonvolatile, or other memory and is not to be limited to any particular type of memory or number of memories, or type of media upon which memory is stored.

The initiating station 412 or 512 and the responding station 410 or 510 can provide the means for implementing the various processes illustrated in the figures and discussed above. The initiating station and/or the responding station can comprise a mobile device, such as the mobile device 200 illustrated in FIG. 2. The initiating station and/or the responding station can comprise a mobile device, such as the node 300 illustrated in FIG. 3. The initiating station and/or the responding station can comprise a mobile device, such as the computing system 1100 illustrated in FIG. 11. The various processes illustrated herein may be implemented in software, hardware, or a combination thereof of the initiating station 412 or 512 and the responding station 410 or 510.

Example Implementations

Example implementations according to the disclosure include one or more of the following.

An example method for establishing a fine timing measurement session (FTM) between wireless devices comprises: receiving, at a first wireless device, a request to establish an FTM session with a second wireless device using an FTM protocol, the request comprising one or more session parameters having a value indicative that the second wireless device is requesting the FTM session have an infinite session duration; establishing an infinite FTM session with the second wireless device based on the request parameters; and sending one or more FTM measurement messages to the second wireless device until a request message is received from the second wireless device requesting that the infinite FTM session be terminated.

Implementations of such a method may include one or more of the following features. Sending the one or more FTM measurement messages to the second wireless device until a request message is received from the second wireless device requesting that the FTM session be terminated further comprises: determining the value of a timing synchronization function parameter based on a time at which a message was received from the second wireless device; and inserting the value of the timing synchronization function parameter into a next FTM measurement message being sent to the second wireless device following the receipt of the message from the first wireless device at the second wireless device. The method further comprises: receiving a request message from the second wireless device; and determining whether the request message comprises a request from the second wireless device to terminate the infinite FTM session. The request message comprises an FTM request frame, and determining whether the request message comprises a request to terminate the infinite FTM session comprises extracting a value from at least one filed of the FTM request frame indicative of whether the FTM session is to be terminated.

An example apparatus for establishing a fine timing measurement (FTM) session between wireless devices comprises: means for receiving, at the apparatus, a request to establish an FTM session with a second wireless device using an FTM protocol, the request comprising one or more session parameters having a value indicative that the second wireless device is requesting the FTM session have an infinite session duration; means for establishing an infinite FTM session with the second wireless device based on the request parameters; and means for sending one or more FTM measurement messages to the second wireless device until a request message is received from the second wireless device requesting that the infinite FTM session be terminated.

Implementations of such an apparatus may include one or more of the following features. The means for sending the one or more FTM measurement messages to the second wireless device until a request message is received from the second wireless device requesting that the FTM session be terminated further comprises: means for determining the value of a timing synchronization function parameter based on a time at which a message was received from the second wireless device; and means for inserting the value of the timing synchronization function parameter into a next FTM measurement message being sent to the second wireless device following the receipt of the message from the second wireless device. The apparatus further comprises: means for receiving a request message from the second wireless device; and means for determining whether the request message comprises a request from the second wireless device to terminate the infinite FTM session. The request message comprises an FTM request frame, and the means for determining whether the request message comprises a request to terminate the infinite FTM session comprises means for extracting a value from at least one filed of the FTM request frame indicative of whether the FTM session is to be terminated.

An example apparatus for establishing a fine timing measurement (FTM) session between wireless devices comprises: a memory; a transceiver configured to receive a request to establish an FTM session with a second wireless device using an FTM protocol, the request comprising one or more session parameters having a value indicative that the second wireless device is requesting the FTM session have an infinite session duration; and at least one processor coupled to the memory and the transceiver, the at least one processor being configured to establish an infinite FTM session with the second wireless device based on the request parameters, the at least one processor being further configured to send one or more FTM measurement messages to the second wireless device via the transceiver until a request message is received from the second wireless device requesting that the infinite FTM session be terminated.

Implementations of such an apparatus may include one or more of the following features. The at least one processor is further configured to: determine the value of a timing synchronization function parameter based on a time at which a message was received from the second wireless device; and insert the value of the timing synchronization function parameter into a next FTM measurement message being sent to the second wireless device following the receipt of the message from the second wireless device. The transceiver is configured to receive a request message from the second wireless device, and wherein the at least one processor is configured to determine whether the request message comprises a request from the second wireless device to terminate the infinite FTM session. The request message comprises an FTM request frame, and the at least one processor is further configured to extract a value from at least one filed of the FTM request frame indicative of whether the FTM session is to be terminated.

An example of a non-transitory, computer-readable medium, having stored thereon computer-readable instructions for establishing a fine timing measurement (FTM) session between wireless devices, comprises instructions configured to cause a computer to: receive a request to establish an FTM session with a second wireless device using an FTM protocol, the request comprising one or more session parameters having a value indicative that the second wireless device is requesting the FTM session have an infinite session duration; establish an infinite FTM session with the second wireless device based on the request parameters; and send one or more FTM measurement messages to the second wireless device until a request message is received from the second wireless device requesting that the infinite FTM session be terminated.

Implementations of such a computer-readable medium may include one or more of the following features. The non-transitory, computer-readable medium further comprises instructions configured to cause the computer to: determine the value of a timing synchronization function parameter based on a time at which a message was received from the second wireless device; and insert the value of the timing synchronization function parameter into a next FTM measurement message being sent to the second wireless device following the receipt of the message from the second wireless device. The non-transitory, computer-readable medium further comprises instructions configured to cause the computer to receive a request message from the second wireless device and to determine whether the request message comprises a request from the second wireless device to terminate the infinite FTM session. The request message comprises an FTM request frame, and non-transitory, computer-readable medium further comprises instructions configured to cause the computer to: extract a value from at least one filed of the FTM request frame indicative of whether the FTM session is to be terminated.

If implemented in-part by hardware or firmware along with software, the functions can be stored as one or more instructions or code on a computer-readable medium. Examples include computer-readable media encoded with a data structure and computer-readable media encoded with a computer program. Computer-readable media includes physical computer storage media. A storage medium can be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and can be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device can also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

What is claimed is:

1. A method for establishing a fine timing measurement (FTM) session between wireless devices, the method comprising:
   generating, at a first wireless device, a first request to establish an FTM session with a second wireless device using an FTM protocol, the first request comprising one or more session parameters having a value indicative that the first wireless device is requesting the FTM session have an infinite session duration;
   receiving a plurality of FTM measurement messages from the second wireless device, wherein each FTM measurement message comprises a timing synchronization parameter for synchronizing a timer of the first wireless device with a timer of the second wireless device; and
   sending a second request to the second wireless device requesting that the FTM session be terminated.

2. The method of claim 1, further comprising:
   determining a range from the first wireless device to the second wireless device based on an FTM measurement message from the second wireless device.

3. The method of claim 1, further comprising:
   extracting a value of the timing synchronization function parameter from the plurality of FTM measurement messages received from the second wireless device; and
   synchronizing a timer of the first wireless device with the value of the timing synchronization function parameter extracted from the plurality of FTM measurement messages.

4. The method of claim 1, wherein the first request to establish the FTM session comprises an FTM request frame, the method of claim 1 further comprising:
   setting a value of at least one field of the FTM request frame to a value indicating that the FTM session is to be terminated.

5. The method of claim 1, wherein the first request to establish the FTM session with the second wireless device comprises an FTM request frame, and wherein generating the first request to establish the FTM session with the second wireless device using the FTM protocol further comprises setting a value of at least one field of the FTM request frame to a value indicating that the FTM session is to be of infinite duration.

6. The method of claim 5, wherein the value indicating that the FTM session is to be of an infinite duration comprises a value indicative that the first wireless device is has no preference with regard to an FTM parameter associated with the at least one field, wherein the second wireless device is configured to recognize that the value of the at least one field is indicative of the first wireless device requesting the FTM session is to be of infinite duration.

7. An apparatus for establishing a fine timing measurement (FTM) session between wireless devices, the apparatus comprising:
   means for generating, at a first wireless device, a first request to establish an FTM session with a second wireless device using an FTM protocol, the first request comprising one or more session parameters having a value indicative that the first wireless device is requesting the FTM session have an infinite session duration;
   means for receiving a plurality of FTM measurement messages from the second wireless device, wherein each FTM measurement message comprises a timing synchronization parameter for synchronizing a timer of the first wireless device with a timer of the second wireless device; and
   means for sending a second request to the second wireless device requesting that the FTM session be terminated.

8. The apparatus of claim 7, further comprising:
   means for determining a range from the first wireless device to the second wireless device based on an FTM measurement message from the second wireless device.

9. The apparatus of claim 7, further comprising:
   means for extracting the value of a timing synchronization function parameter from the plurality of FTM measurement messages received from the second wireless device; and
   means for synchronizing a timer of the first wireless device with the value of the timing synchronization function parameter extracted from the plurality of FTM measurement messages.

10. The apparatus of claim 7, wherein the first request to establish the FTM session comprises an FTM request frame, the apparatus further comprising:
    means for setting a value of at least one field of the FTM request frame to a value indicating that the FTM session is to be terminated.

11. The apparatus of claim 7, wherein the first request to establish the FTM session with the second wireless device comprises an FTM request frame, and wherein the means for generating the first request to establish the FTM session with the second wireless device using the FTM protocol further comprises means for setting a value of at least one field of the FTM request frame to a value indicating that the FTM session is to be of infinite duration.

12. The apparatus of claim 11, wherein the value indicating that the FTM session is to have an infinite session duration comprises a value indicative that the first wireless device is has no preference with regard to an FTM parameter associated with the at least one field, wherein the second wireless device is configured to recognize that the value of the at least one field is indicative of the first wireless device requesting the FTM session is to be of infinite duration.

13. An apparatus for establishing a fine timing measurement (FTM) session between wireless devices, the apparatus comprising:
    a memory; and
    at least one processor coupled to the memory, the at least one processor being configured to generate, at a first wireless device, a first request to establish an FTM session with a second wireless device using an FTM protocol, the first request comprising one or more session parameters having a value indicative that the first wireless device is requesting the FTM session have an infinite session duration;
    a receiver configured to receive a plurality of FTM measurement messages from the second wireless device, wherein each FTM measurement message comprises a timing synchronization parameter for synchronizing a timer of the first wireless device with a timer of the second wireless device; and
    the at least one processor being further configured to send a second request to the second wireless device requesting that the FTM session be terminated.

14. The apparatus of claim 13, wherein the at least one processor is further configured to:
    determine a range from the first wireless device to the second wireless device based on an FTM measurement message from the second wireless device.

15. The apparatus of claim 13, wherein the at least one processor is further configured to:
    extract a value of the timing synchronization function parameter from the plurality of FTM measurement messages received from the second wireless device; and
    synchronize a timer of the first wireless device with the value of the timing synchronization function parameter extracted from the plurality of FTM measurement messages.

16. The apparatus of claim 13, wherein the first request to establish the FTM session comprises an FTM request frame, and wherein the at least one processor is further configured to:
    set a value of at least one field of the FTM request frame to a value indicating that the FTM session is to be terminated.

17. The apparatus of claim 13, wherein the first request to establish the FTM session with the second wireless device comprises an FTM request frame, and wherein the at least one processor being configured to generate the first request to establish the FTM session with the second wireless device using the FTM protocol is further configured to set a value of at least one field of the FTM request frame to a value indicating that the FTM session is to be of infinite duration.

18. The apparatus of claim 17, wherein the value indicating that the FTM session is to have an infinite session duration comprises a value indicative that the first wireless device is has no preference with regard to an FTM parameter associated with the at least one field, wherein the second wireless device is configured to recognize that the value of the at least one field is indicative of the first wireless device requesting the FTM session is to be of infinite duration.

19. A non-transitory, computer-readable medium, having stored thereon computer-readable instructions for establishing a fine timing measurement (FTM) session between wireless devices, comprising instructions configured to cause a computer to:
    generate a first request to establish an FTM session with a second wireless device using an FTM protocol, the first request comprising one or more session parameters having a value indicative that a first wireless device is requesting the FTM session have an infinite session duration;
    receive a plurality of FTM measurement messages from the second wireless device, wherein each FTM measurement message comprises a timing synchronization parameter for synchronizing a timer of the first wireless device with a timer of the second wireless device; and
    send a second request to the second wireless device requesting that the FTM session be terminated.

20. The non-transitory, computer-readable medium of claim 19, further comprising instructions configured to cause the computer to:
    determine a range from the first wireless device to the second wireless device based on an FTM measurement message from the second wireless device.

21. The non-transitory, computer-readable medium of claim 19, further comprising instructions configured to cause the computer to:
    extract a value of the timing synchronization function parameter from the plurality of FTM measurement messages received from the second wireless device; and
    synchronize a timer of the first wireless device with the value of the timing synchronization function parameter extracted from the plurality of FTM measurement messages.

22. The non-transitory, computer-readable medium of claim 19, wherein the first request to establish the FTM session comprises an FTM request frame, and further comprising instructions configured to cause the computer to:
    set a value of at least one field of the FTM request frame to a value indicating that the FTM session is to be terminated.

23. The non-transitory, computer-readable medium of claim 19, wherein the first request to establish the FTM session with the second wireless device comprises an FTM request frame, and wherein the instructions configured to cause the computer to generate the first request to establish the FTM session with the second wireless device using the FTM protocol further comprise instructions configured to cause the computer to set a value of at least one field of the FTM request frame to a value indicating that the FTM session is to be of infinite duration.

24. The non-transitory, computer-readable medium of claim 23, wherein the value indicating that the FTM session is to have an infinite session duration comprises a value indicative that the first wireless device is has no preference with regard to an FTM parameter associated with the at least one field, wherein the second wireless device is configured to recognize that the value of the at least one field is indicative of the first wireless device requesting the FTM session is to be of infinite duration.

* * * * *